United States Patent Office
3,126,391
Patented Mar. 24, 1964

3,126,391
ALKOXYALKYL 18-O-ALKOXYALKYL-3-ISO-DESERPIDATES, AND ANALOGS AND 18-EPIMERS THEREOF
Michael Mullen Robison, Berkeley Heights, and Robert Armistead Lucas, Mendham, N.J., assignors to Ciba Corporation, New York, N.Y., a corporation of Delaware
No Drawing. Filed Jan. 31, 1962, Ser. No. 170,248
14 Claims. (Cl. 260—287)

The present invention concerns allo-yohimbane compounds having the nucleus of the formula:

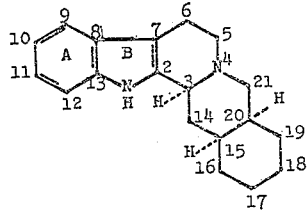

More particularly, it relates to lower alkoxy-lower alkyl 18-R-allo-yohimbane 16β-carboxylates, more especially lower alkoxy-lower alkyl 18α-R-17α-R₁-allo-yohimbane 16β-carboxylates, in which R is lower alkoxy or particularly lower alkoxy-lower alkyl, and R₁ is primarily lower alkoxy, as well as cyano, or N-lower alkanoyl-N-lower alkyl-amino, salts, N-oxides or salts of N-oxides of such compounds. Apart from the groups in the 16β-position, the 17α-position and in the 18-position, the compounds of the present invention may have additional substituents, which are preferably attached to positions of the aromatic nucleus, i.e. ring A, more specifically to the 9-position, the 10-position, the 11 position and/or the 12-position; such substituents are, for example, aliphatic hydrocarbon, such as lower alkyl and the like, etherified hydroxyl, particularly lower alkoxy, as well as cycloalkyloxy, cycloalkyl-lower alkoxy, carbocyclic aryloxy, carbocyclic aryl-lower alkoxy, lower alkylenedioxy and the like, esterified hydroxyl, particularly halogeno, as well as lower alkoxy-carbonyloxy, lower alkanoyloxy and the like, etherified mercapto, such as lower alkylmercapto and the like, nitro, amino, such as N,N-disubstituted amino and the like, trifluoromethyl, or any other suitable substituent. Other substituents, particularly aliphatic hydrocarbon radicals, such as lower alkyl, may also be attached to positions available for substitution in other nuclei, particularly of the heterocyclic nucleus C, more specifically to the 5-position and/or the 6-position.

More especially, the invention is directed to compounds of the formula:

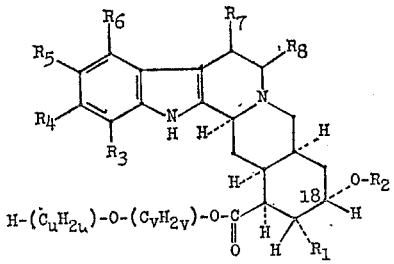

in which the letter $u$ stands for an integer from 1 to 4, the letter $v$ stands for an integer from 2 to 4, the group of the formula —$(C_vH_{2v})$— separates the two oxygen atoms attached to this radical by at least two carbon atoms, $R_1$ stands for lower alkoxy, cyano or N-lower alkanoyl-N-lower alkyl-amino, $R_2$ is lower alkyl or lower alkoxy-lower alkyl, in which lower alkyl, having from two to four carbon atoms, separates lower alkoxy from the 18-oxygen atom by at least two carbon atoms, each of the radicals $R_3$, $R_4$, $R_5$ and $R_6$ stands for hydrogen, aliphatic hydrocarbon, particularly lower alkyl, trifluoromethyl, etherified hydroxyl, particularly lower alkoxy, as well as cycloalkyloxy, cycloalkyl-lower alkoxy, carbocyclic aryloxy, carbocyclic aryl-lower alkoxy or any other analogous etherified hydroxyl group, esterified hydroxyl, particularly halogeno, as well as lower alkoxy-carbonyloxy, lower alkanoyloxy and the like, etherified mercapto, particularly lower alkyl-mercapto, nitro, amino, particularly N,N,-di-substituted amino and the like, or, whenever two of the groups $R_3$, $R_4$, $R_5$ and $R_6$ are attached to two adjacent positions and are taken together, for lower alkylenedioxy, and each of the groups $R_7$ and $R_8$ stands for hydrogen or lower alkyl, salts, N-oxides or salts of N-oxides of such compounds, as well as process for the preparation of such compounds.

The invention is also directed to compounds of the formula:

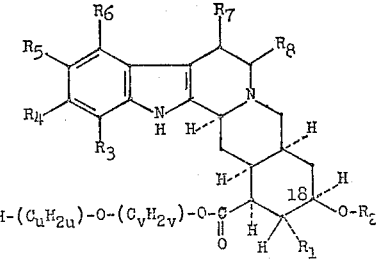

in which the letters $u$ and $v$, the group of the formula —$(C_vH_{2v})$— and the substituents $R_1$, $R_2$, $R_3$, $R_4$, $R_5$, $R_6$, $R_7$ and $R_8$ have the previously-given meaning, salts, N-oxides or salts of N-oxides thereof, as well as process for the preparation of such compounds.

The lower alkoxy-lower alkyl group of the 16β-carboxylic acid ester portion, which in the above formulae is represented by the group of the formula

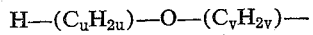

$$H—(C_uH_{2u})—O—(C_vH_{2v})—$$

stands for lower alkoxy-lower alkyl, in which the lower alkyl portion is represented by lower alkylene (in the above formulae by —$(C_vH_{2v})$—), which has from two to four carbon atoms and separates the lower alkoxy group from the carboxyl group by at least two carbon atoms; preferably, such lower alkylene radical has from two to three carbon atoms and separates the lower alkoxy group from the carboxyl group by the same number of carbon atoms. Such alkylene radical is primarily 1,2-ethylene, as well as 1,2-propylene, 1,3-propylene, 1,4-butylene and the like. The lower alkoxy portion of a lower alkoxy-lower alkyl substituent as represented by

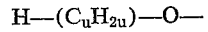

$$H—(C_uH_{2u})—O—$$

in the above formulae, has preferably from one to four carbon atoms, e.g. methoxy, ethoxy, n-propyloxy, iso-propyloxy, n-butyloxy, secondary butyloxy and the like. Lower alkoxy-lower alkyl, as represented by

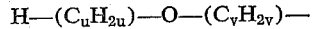

$$H—(C_uH_{2u})—O—(C_vH_{2v})—$$

in the above formulae, is, above all, 2-lower alkoxy-ethyl, e.g. 2-methoxyethyl, 2-ethoxyethyl, 2-n-propyloxyethyl, 2-isopropyloxyethyl and the like, as well as 2-lower alkoxypropyl, e.g. 2-methoxypropyl and the like, 3-lower alkoxy-propyl, e.g. 3-methoxypropyl, 3-ethoxypropyl and the like.

The substituent attached to the 17α-position, as represented by the group $R_1$ in the above formulae, may stand for cyano or N-lower alkanoyl-N-lower alkyl-amino, e.g. N-acetyl-N-methyl-amino, N-acetyl-N-ethyl-amino, N-methyl-N-propionyl-amino and the like. It primarily represents lower alkoxy, which has preferably from one to four carbon atoms, and stands, above all, for methoxy, as well as for ethoxy, n-propyloxy, isopropyloxy, n-butyloxy, isobutyloxy and the like.

Lower alkoxy attached to the 18-position and represented by $R_2$—O— in the above formulae, $R_2$ standing for lower alkyl, has preferably from one to four carbon atoms and is, for example, methoxy, ethoxy, n-propyloxy, isopropyloxy, n-butyloxy, isobutyloxy and the like. The lower alkyl group $R_2$ in the above formulae, which has preferably from one to four carbon atoms, stands, therefore, for methyl, ethyl, n-propyl, isopropyl, n-butyl, isobutyl and the like.

The lower alkoxy-lower alkoxy group attached to the 18-position, is the preferred substituent in that position; in the above formulae it is represented by $R_2$—O—, in which $R_2$ stands for lower alkoxy-lower alkyl. In this substituent, the lower alkyl portion connecting lower alkoxy with the oxygen atom attached to the 18-position is represented by lower alkylene having preferably from two to four, especially from two to three, carbon atoms and separating lower alkoxy from said oxygen atom by at least two, preferably by from two to three, carbon atoms, above all, by 1,2-ethylene, as well as 1,2-propylene, 1,3-propylene, 1,4-butylene and the like. The lower alkoxy portion connected to the 18-oxygen atom through said alkylene radical has preferably from one to four carbon atoms and may be represented by, for example, methoxy, ethoxy, n-propyloxy, isopropyloxy, n-butyloxy, secondary butyloxy and the like. The lower alkoxy-lower alkoxy radical attached to the 18-position is, above all, 2-lower alkoxy-ethoxy, e.g. 2-methoxyethoxy, 2-ethoxyethoxy, 2-n-propyloxyethoxy, 2-isopropyloxyethoxy and the like, as well as 2-lower alkoxypropyloxy, e.g. 2-methoxypropyloxy and the like, 3-lower alkoxypropyloxy, e.g. 3-methoxypropyloxy, 3-ethoxypropyloxy and the like. $R_2$ in the above formulae, standing for lower alkoxy-lower alkyl, is, therefore, above all, 2-lower alkoxy-ethyl, e.g. 2-methoxyethyl, 2-ethoxyethyl, 2-n-propyloxyethyl, 2-isopropyloxyethyl and the like, as well as 2-lower alkoxy-propyl, e.g. 2-methoxypropyl, 2-ethoxypropyl and the like, 3-lower alkoxy-propyl, e.g. 3-methoxypropyl, 3-ethoxypropyl and the like.

Substituents attached to any of the positions available for substitution in ring A and represented by the groups $R_3$, $R_4$, $R_5$ and $R_6$ (each of which may also stand for hydrogen) in the previously-given formulae, may be, for example, lower aliphatic hydrocarbon, especially lower alkyl having preferably from one to four carbon atoms, e.g. methyl, ethyl, n-propyl, isopropyl, n-butyl and the like, or functional groups, such as, for example, etherified hydroxyl, particularly lower alkoxy having preferably from one to four carbon atoms, e.g. methoxy, ethoxy, n-propyloxy, isopropyloxy, n-butyloxy, isobutyloxy and the like, as well as alkenyloxy, e.g. allyloxy and the like, cycloalkyloxy, in which cycloalkyl has from three to eight, preferably from five to six, ring carbon atoms, e.g. cyclopentyloxy, cyclohexyloxy and the like, cycloalkyl-lower alkoxy, in which cycloalkyl has from three to eight, preferably from five to six, ring carbon atoms, e.g. cyclopentylmethoxy, 2-cyclopentylethoxy, cyclohexylmethoxy and the like, carbocyclic aryloxy, such as monocyclic carbocyclic aryloxy, e.g. phenyloxy and the like, carbocyclic aryl-lower alkoxy, such as monocyclic carbocyclic aryl-lower alkoxy, for example, phenyl-lower alkoxy, e.g. benzyloxy, diphenylmethoxy, 2-phenylethoxy and the like, esterified hydroxyl, particularly halogeno (representing hydroxyl esterified by hydrohalic acid), particularly halogeno having an atomic weight below 80, e.g. fluoro, chloro, bromo and the like, as well as lower alkoxy-carbonyloxy, e.g. methoxycarbonyloxy, ethoxycarbonyloxy and the like, or lower alkanoyloxy, e.g. acetoxy, propionyloxy and the like, etherified mercapto, particularly lower alkyl-mercapto, having preferably from one to four carbon atoms, e.g. methylmercapto, ethylmercapto and the like, nitro, amino, particularly N,N-disubstituted amino, such as N, N-di-lower alkyl-amino, eg. N,N-dimethylamino, N-ethyl-N-methyl-amino, N,N-diethylamino and the like, trifluoromethyl and the like, or any other suitable functional group. A substituent may also be attached to two adjacent positions of ring A and form a ring fused onto that ring. For example, two of the radicals $R_3$, $R_4$, $R_5$ and $R_6$ in the above formulae, when substituting two neighboring positions and taken together, may also form a fused-on cyclic substituent; such substituent may be represented, for example, by lower alkylene-dioxy, e.g. methylenedioxy, 1,1-ethylenedioxy and the like, or any other analogous grouping.

Substituents, which may be attached to other positions in the molecule, particularly to positions in ring C, are primarily aliphatic hydrocarbon, such as lower alkyl having preferably from one to four carbon atoms, particularly methyl, as well as ethyl, n-propyl, isopropyl and the like. The radicals $R_7$ and $R_8$ in the previously-given formulae, which stands primarily for hydrogen, may, therefore, also represent lower alkyl, particularly methyl, as well as ethyl and the like.

Salts of the compounds of this invention are primarily pharmaceutically acceptable, non-toxic acid addition salts, such as those with inorganic acids, e.g. hydrochloric, hydrobromic, sulfuric, phosphoric acids and the like, with organic carboxylic acids, e.g. acetic, succinic, maleic, citric, tartaric acid and the like, or with organic sulfonic acid, e.g. methane sulfonic acid, 1,2-ethane sulfonic acid, p-toluene sulfonic acid and the like.

Also included within the scope of the present invention are the N-oxides of the above compounds, as well as the pharmaceutically acceptable, non-toxic acid addition salts of these N-oxides, such as the addition salts with the above-mentioned inorganic or organic acids.

In view of the fact that several asymmetric carbon atoms are present in the compounds of this invention, the latter may be obtained in the form of a mixture of racemates, racemates or optically pure compounds.

Compounds of the 3-epi-allo-yohimbane 16β-carboxylic acid ester series, which have in the 18-position an esterified or etherified hydroxyl group, i.e. compounds which have a structural conformation related to that of reserpine, are known and show various types of useful pharmacological properties, such as anti-hypertensive and/or tranquilizing effects; these effects may vary considerably from one type of compound to the other, which may also show other advantages over one another, such as onset and duration of pharmacological action, etc. The known compounds of the allo-yohimbane 16β-carboxylic acid ester series, which have in the 18-position an esterified or etherified hydroxyl group, i.e. compounds which have a structural conformation related to that of 3-isoreserpine, are devoid of any useful pharmacological activity. For example, whereas reserpine (having the structural conformation of a 3-epi-allo-yohimbane 16β-carboxylic acid ester) shows exceptionally strong anti-hypertensive and tranquilizing effects, its 3-isomer, the 3-iso-reserpine (having the structural conformation of an allo-yohimbane 16β-carboxylic acid ester) is for all practical purposes inactive. It was, therefore, assumed that the structural conformation of a 3-epi-allo-yohimbane 16β-carboxylic acid ester (for example, that of reserpine) is required for pharmacological activity, particularly because isomerization at the 3-position causes a fundamental change in the over-all spatial arrangement of the molecule.

We have now found that the compounds of this invention, which have the structural conformation of the allo-yohimbane 16β-carboxylic acid esters (for example, that of 3-iso-reserpine) show pronounced central nervous system stimulating effects. Moreover, this type of activity has not been found in or associated with any of the pharmacologically active reserpine-type compounds. Furthermore, the compounds of this invention are remarkably free from any side effects, particularly properties usually associated with stimulating compounds, such as hypertension, tachycardia and the like, and they do not show any antihypertensive effects, such as those exhibited by reserpine or analogs thereof. In addition, the onset of the stimulating action is fast and of definite duration, which characteristics make the compounds useful in the treatment of emergency cases and preclude an accumulative action.

The compounds of this invention are, therefore, useful as stimulants in the treatment of states of depression, lethargy and the like, particularly in connection with mental diseases and disorders.

A preferred group of compounds having the above-given properties is represented by the formula:

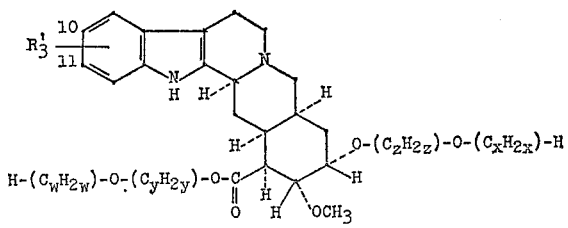

in which each of the letters $w$ and $x$ stands for an integer from 1 to 4, and each of the letters $y$ and $z$ stands for an integer from 2 to 3, and each of the radicals of the formulae $—(C_yH_{2y})—$ and $—(C_zH_{2z})—$ separates the two oxygen atoms attached to these radicals by two to three carbon atoms, and $R_3'$ is hydrogen or lower alkoxy having from one to four carbon atoms, particularly methoxy, as well as ethoxy, n-propyloxy, isopropyloxy, n-butyloxy and the like, whereby $R_3'$ is preferably attached to the 10-position or the 11-position, or pharmaceutically acceptable, non-toxic acid addition salts thereof.

These compounds may be represented by the lower alkoxy-lower alkyl 18-epi-O-lower alkoxy-lower alkyl-3-iso-reserpates, in which lower alkyl has from two to three carbon atoms, and separates lower alkoxy having from one to four carbon atoms, by from two to three carbon atoms from the 16β-carboxyl group and the 18α-oxygen atom, respectively, especially by the 2-lower alkoxy-ethyl 18-epi-O-(2-lower alkoxy-ethyl)-3-iso-reserpates, in which lower alkoxy has from one to four carbon atoms, or pharmaceutically acceptable, non-toxic acid addition salts thereof.

The compounds of this invention may be used in the form of pharmaceutical preparations for enteral or parenteral administration, which contain the new compounds or derivatives thereof, such as acid addition salts thereof, in admixture with a suitable organic or inorganic, solid or liquid carrier. For making up the preparations, there can be employed inert substances, which are compatible with the new compounds, such as water, gelatine, lactose, starches, stearic acid, magnesium stearate, stearyl alcohol, talc, vegetable oils, benzyl alcohols, gums, waxes, propylene glycol, polyalkylene glycols or any other known carrier used in pharmaceutical preparations. The latter may be in solid form, for example, as tablets, capsules, dragees and the like, or in liquid form, for example, as solutions, suspensions, emulsions and the like. If desired, they may contain additional substances, such as preserving, stabilizing, wetting, emulsifying agents and the like, salts for varying the osmotic pressure, buffers or any other auxiliary substances. They may also contain in combination, other useful substances.

The lower alkoxy-lower alkyl 18-R-allo-yohimbane 16β-carboxylates, in which R has the previously-given meaning, particularly the compounds mentioned hereinbefore as the preferred embodiments of this invention, salts, N-oxides or salts of N-oxides of such compounds may be prepared according to different procedures, in which those starting materials are especially suitable which lead to the aforementioned preferred compounds.

For example, they may be prepared by removing in a lower alkoxy-lower alkyl Δ³-18-R-allo-yohimbene 16β-carboxylate, in which R has the previously-given meaning, or a salt thereof, the double bond extending from the 3-position by reduction and isolating the desired lower alkoxy-lower alkyl 18-R-allo-yohimbane 16β-carboxylate, and, if desired, converting a resulting salt into the free compound or into another salt, and/or, if desired, converting in a resulting compound the esterified carboxyl group into another esterified carboxyl group, and/or, if desired, converting a resulting compound into the N-oxide, and/or, if desired, converting a resulting compound or an N-oxide into a salt thereof, and/or, if desired, converting a resulting N-oxide into the free compound, and/or, if desired, separating a mixture of isomers into the single isomers.

The double bond in the starting material is located in the 3(14)-position or in the 3(4)-position. In the free base the double bond is in the 3(14)-position, whereas in a salt the double bond is in the 3(4)-position; the double bond also shifts to the latter position whenever the base is dissolved in a polar solvent.

The anion of the salts is primarily the anion of a strong inorganic acid, such as hydrochloric, hydrobromic, sulfuric, phosphoric acid, and the like, as well as a halogenophosphoric acid, e.g. chlorophosphoric acid and the like, or perchloric acid or any other suitable acid. It may also be the anion of an organic acid; a salt with an organic acid may be formed whenever a solution of the starting material in an organic acid, e.g. acetic acid and the like, is used in the above procedure.

Removal of the double bond may be carried out according to known methods, such as by catalytic hydrogenation, for example, by treatment with hydrogen in the presence of a catalyst containing a metal of the eighth group of the Periodic System, e.g. nickel, palladium, platinum and the like, such as Raney nickel, palladium black, platinum oxide and the like, preferably in the presence of a solvent, such as a lower alkanol, e.g. methanol, ethanol and the like, or another suitable diluent, such as a lower alkanoic acid, e.g. acetic acid and the like. If necessary, the reduction may be carried out under increased pressure, and/or while cooling or at an elevated temperature.

The removal of the double bond is preferably accomplished by treatment with a light metal hydride, particularly a light metal borohydride, such as an alkali metal borohydride, e.g. lithium borohydride, sodium borohydride, potassium borohydride and the like, an alkaline earth metal borohydride, e.g. calcium borohydride, barium borohydride, strontium borohydride and the like, or an alkali metal lower alkoxy-borohydride, e.g. sodium trimethoxyborohydride and the like. These reagents are preferably used in the presence of a solvent, such as, for example, a lower alkanol, e.g. methanol, ethanol and the like, a formamide, e.g. formamide, N,N-dimethyl-formamide and the like, or any other suitable diluent. If necessary, the temperature may be elevated, and the reaction may be carried out in the atmosphere of an inert gas, e.g. nitrogen. Other suitable light metal hydrides are certain inorganic or organic aluminum hydrides.

The reduction of the double bond extending from the 3-position may also be carried out by treatment with metal amalgam in the presence of a moist solvent, such as an alkali metal amalgam, e.g. sodium amalgam and the like, or aluminum amalgam in the presence of moist ether or any other suitable solvent. Other reagents, such as suitable heavy metals, e.g. zinc and the like, in the presence of acids, e.g. acetic, hydrochloric, perchloric acid and the like, or alkali metals, e.g. sodium, potassium and the like, in the presence of lower alkanols, e.g.

ethanol, tertiary butanol and the like, may also be suitable for the removal of the double bond.

The starting materials of the above procedure may be prepared, for example, by reacting a lower alkoxy-lower alkyl 18-R-3-oxo-2,3-seco-allo-yohimbane 16β-carboxylate, in which R has the previously-given meaning, with a ring-closing reagent, and, if desired, converting a resulting salt into the free compound, and/or, if desired, converting a free compound into a salt thereof.

Ring closure of the above-described 3-oxo-2,3-seco-allo-yohimbane compounds may be carried out according to known methods, for example, by treatment with an acidic ring-closing reagent, for example, a phosphoric acid, e.g. polyphosphoric acid and the like, a phosphorus halide, e.g. phosphorus trichloride, phosphorus pentachloride, or advantageously a phosphorus oxyhalide, e.g. phosphorus oxychloride and the like.

The 3-oxo-2,3-seco-allo-yohimbane compounds used as the intermediates in the preparation of the Δ³-allo-yohimbene starting materials may be prepared according to different procedures. For example, in a lower alkoxy-lower alkyl 18-hydroxy-3-oxo-2,3-seco-allo-yohimbane 16β-carboxylate compound the free hydroxyl group may be etherified. Etherification may be carried out, for example, by treatment with a lower diazo-alkane or a lower alkoxy-lower diazo-alkane in the presence of fluoboric acid or any other suitable Lewis acid, according to a method to be described in detail hereinbelow.

This etherification procedure is particularly suitable for the preparation of 3-oxo-2,3-seco-allo-yohimbane compounds, which can be prepared directly from products obtained according to known totally synthetic methods.

The intermediate 3-oxo-2,3-seco-allo-yohimbane compounds may also be prepared by esterifying in a lower alkoxy-lower alkyl 18-hydroxy-3-oxo-2,3-seco-allo-yohimbane 16β-carboxylate the free hydroxyl group by treatment with an organic sulfonic acid halide, particularly a monocyclic carbocyclic aryl sulfonyl halide, as well as an aliphatic sulfonic acid halide, and treating a resulting lower alkoxy-lower alkyl 18-organic sulfonyloxy-3-oxo-2,3-seco-allo-yohimbane 16β-carboxylate with a lower alkanol or a lower alkoxy-lower alkanol. Esterification with an organic sulfonic acid halide, for example, with a halogeno-benzene sulfonic acid halide, e.g. 4-bromo-benzene sulfonic acid chloride, or a nitro-benzene sulfonic halide, e.g. 3-nitro-benzene sulfonic acid chloride, 4-nitro-benzene sulfonic acid chloride and the like, or any other suitable sulfonic acid halide, is carried out, for example, in the presence of an organic base, e.g. pyridine and the like. Alcoholysis of the 18-organic sulfonyloxy group may be achieved by treatment with the lower alkanol or lower alkoxy-lower alkanol, preferably in the presence of a base, such as an organic amine, e.g. N,N,N-triethylamine, pyridine and the like. Alcoholysis of the 18-organic sulfonyloxy group causes inversion at the 18-carbon atom. Details of the esterification and alcoholysis reactions are described hereinbelow. This procedure is particularly suitable for the preparation of 3-oxo-2,3-seco-allo-yohimbane compounds with the group R of the 18-position having the α-configuration as compared with the products resulting from known totally synthetic methods.

The lower alkoxy-lower alkyl 18α-hydroxy-3-oxo-2,3-seco-allo-yohimbane 16β-carboxylates, which compounds are used either in the above etherification procedure to form the lower alkoxy-lower alkyl 18α-R-3-oxo-2,3-seco-allo-yohimbane 16β-carboxylates or in the esterification to the lower alkoxy-lower alkyl 18α-organic sulfonyloxy-3-oxo-2,3-seco-allo-yohimbane 16β-carboxylates and subsequent alcoholysis of the latter to form the lower alkoxy-lower alkyl 18β-R-3-oxo-2,3-seco-allo-yohimbane 16β-carboxylates, may be obtained by hydrolysis of the lower alkoxy-lower alkyl 18β-organic sulfonyloxy-3-oxo-2,3-seco-allo-yohimbane 16β-carboxylates with water, preferably in the presence of a base, such as an organic amine, e.g. N,N,N-triethylamine, pyridine and the like.

The lower alkoxy-lower alkyl 18-R-3-oxo-2,3-seco-allo-yohimbane 16β-carboxylates may also be prepared, for example, by ring closure of a lower alkoxy-lower alkyl 18-R-3-lower alkoxy-3-oxo-2,3;3,4 - bis - seco-allo-yohimbane 16β-carboxylate or a salt thereof. Ring closure may be achieved according to known methods, for example, by treatment of the ester with a ring-closing agent, such as, for example, a carboxylic acid anhydride, e.g. acetic acid anhydride and the like, or any analogous reagent.

The lower alkoxy-lower alkyl Δ³-18-R-allo-yohimbene 16β-carboxylates or salts thereof, which compounds are used as starting materials for the preparation of the lower alkoxy-lower alkyl 18-R-allo-yohimbane 16β-carboxylates according to the previously-described procedure, may also be prepared, for example, by ring closure of a lower alkoxy-lower alkyl 18-organic sulfonyloxy-3-oxo-2,3-seco-allo-yohimbane 16β-carboxylate and subsequent alcoholysis of a resulting lower alkoxy-lower alkyl Δ³-18-organic sulfonyloxy-allo-yohimbene 16β-carboxylate or a salt thereof with a compound of the formula R—OH to yield the desired starting material, i.e. a lower alkoxy-lower alkyl Δ³-18-R-allo-yohimbene 16β-carboxylate. Ring closure (preferably with phosphorus oxy-chloride) and alcoholysis (preferably in the presence of an organic amine) are carried out according to methods described in detail in this specification.

The starting materials used in this procedure may also be prepared by oxidizing a lower alkoxy-lower alkyl 18-R-3-epi-allo-yohimbane 16β-carboxylate or a salt thereof, to form the lower alkoxy-lower alkyl Δ³-18-R-allo-yohimbene 16β-carboxylate or a salt thereof, and, if desired, converting a resulting salt into the free compound, and/or, if desired, converting a free compound into a salt thereof.

Oxidation may be achieved according to known methods, for example, by treatment with mercuric acetate, with tertiary butyl-hypochlorite, or with palladium black in the presence of acetic acid. The preferred method comprises treatment of the lower alkoxy-lower alkyl 18-R-3-epi-allo-yohimbane 16β-carboxylate compound with an oxidation reagent containing hexavalent chromium, particularly potassium dichromate, ammonium dichromate, chromic acid anhydride and the like, in the presence of water or a mixture of water and water-soluble organic solvents, e.g. tetrahydrofuran, acetic acid and the like.

The intermediates used in the above oxidation procedure for the preparation of the starting materials may be prepared, for example, by esterifying in a lower alkoxy-lower alkyl 18-hydroxy-3-epi-allo-yohimbane 16β-carboxylate the free hydroxyl group with a suitable organic sulfonic acid halide and subjecting the resulting lower alkoxy-lower alkyl 18-organic sulfonyloxy-3-epi-allo-yohimbane 16β-carboxylate to alcoholysis with a lower alkanol or a lower alkoxy-lower alkanol, preferably in the presence of an organic base, or by etherifying in a lower alkoxy-lower alkyl 18-hydroxy-3-epi-allo-yohimbane 16β-carboxylate the free hydroxyl group by treatment with a lower diazo-alkane or a lower alkoxy-lower diazo-alkane in the presence of a suitable Lewis acid, particularly fluoboric acid. The above reactions are carried out according to methods to be described in detail hereinbelow.

A further method for the preparation of the compounds of this invention comprises isomerizing in a lower alkoxy-lower alkyl 18-R-3-epi-allo-yohimbane 16β-carboxylate, in which R has the above meaning, a salt, an N-oxide or a salt of an N-oxide thereof, the 3β-hydrogen and isolating the desired lower alkoxy-lower alkyl 18-R-allo-yohimbane 16β-carboxylate, a salt, an N-oxide or a salt of an N-oxide thereof, and, if desired, carrying out the optional steps.

The above isomerization procedure may be performed, for example, by reacting the starting material with an acid. Acids used for the isomerization are, for example, organic carboxylic acids, particularly aliphatic hydrocarbon carboxylic acids, such as lower alkanoic acids, e.g.

acetic, propionic acid and the like, primarily glacial acetic acid, organic sulfonic acids, particularly monocyclic carbocyclic aryl sulfonic acids, e.g. p-toluene sulfonic acid and the like, as well as lower alkane sulfonic acids, e.g. methane sulfonic acid and the like, or strong mineral acids, such as hydrohalic acids, e.g. hydrochloric acid and the like, or mixtures of acids. The reaction may be carried out in the absence or presence of an additional solvent; for example, p-toluene sulfonic acid may also be used in the presence of an organic base, e.g. collidine and the like, whereas hydrogen chloride may be used in an anhydrous lower alkanol, e.g. methanol, ethanol and the like. Isomerization may occur at room temperature or preferably at an elevated temperature, in an open vessel or under pressure, preferably in an atmosphere of nitrogen. Isomerization can also be achieved, for example, by treating the starting material with a hydrogenation catalyst containing a metal of the eighth group of the periodic system, e.g. platinum oxide, palladium on charcoal and the like, preferably in the presence of hydrogen, and, if desired, of an acid, e.g. acetic acid and the like, or a base, e.g. N,N,N-triethylamine and the like.

Optimum yields in the isomerization reaction may be obtained by removing the desired product from the reaction milieu, thus displacing the reaction equilibrium in favor of the product. The removal may be accomplished by separating the product, if desired, in the form of a salt thereof, from any remaining starting material by exploiting the different relative solubilities in different solvent systems. For example, the product or a salt thereof may be separated from the starting material or a salt thereof either by adsorption on a suitable material, such as aluminum oxide, paper and the like, and subsequent fractional elution, or by fractional crystallization from a solvent or a mixture of solvents. The starting material separated from the desired product may then be recycled into the isomerization process, to enhance the over-all yield of the procedure.

The lower alkoxy-lower alkyl 18-R-3-epi-allo-yohimbane 16β-carboxylate compounds used as the starting materials in the above-described isomerization procedure may be prepared as shown hereinabove.

The compounds of this invention may also be formed by reacting a lower alkoxy-lower alkyl 18-organic sulfonyloxy-allo-yohimbane 16β-carboxylate, a salt, an N-oxide or a salt of an N-oxide thereof with a lower alkanol or a lower alkoxy-lower alkanol, and, if desired, carrying out the optional steps.

The organic portion of the organic sulfonyloxy group stands, for example, for an aliphatic radical, such as lower alkyl, e.g. methyl, ethyl, isopropyl and the like, or more especially for a monocyclic carboxylic aryl group, which is represented by phenyl, or, more particularly, by substituted phenyl. The latter is preferably a phenyl radical substituted in the 2-position, 3-position and/or the 4-position by halogeno, primarily bromo, as well as fluoro, chloro or iodo, or by nitro, as well as carbo-lower alkoxy, e.g. carbomethoxy, carbethoxy and the like, carbamyl, cyano or any other suitable groups, such as lower alkyl, especially methyl and the like. Therefore, the organic portion of the organic sulfonyloxy group stands for phenyl, or primarily halogenophenyl, e.g. 4-bromo-phenyl and the like, or nitro-phenyl, e.g. 3-nitro-phenyl, 4-nitrophenyl and the like, as well as cyano-phenyl, e.g. 4-cyanophenyl, as well as di-substituted or trisubstituted phenyl radicals containing such groups.

Treatment of the starting material with the lower alkanol or lower alkoxy-lower alkanol may be carried out in the absence, but more preferably in the presence of a basic reagent. Such reagent is preferably an organic basic reagent. Such as a tertiary amine, especially an aliphatic tertiary amine, such as an N,N,N-tri-lower alkylamine, e.g. N,N,N-trimethylamine, N-ethyl-N,N-dimethylamine, N,N-diethyl-N-methylamine, N,N,N-triethylamine and the like, an N,N,N′,N′-tetra-lower alkyl-lower alkylene-diamine, e.g. N,N,N′,N′-tetramethyl-1,5-pentylene-diamine, N,N,N′,N′-tetramethyl-1,6-hexylene-diamine, N,N,N′,N′-tetraethyl-1,6-hexylenediamine, N,N,N′,N′-tetramethyl-1,7-heptylene-diamine and the like, a 1-lower alkyl-N,N-alkyleneimine, in which alkylene contains from four to six carbon atoms, e.g. 1-methyl-pyrrolidine, 1-methylpiperidine, 1-ethyl-piperidine, 1-methyl-N,N-hexamethylene-imine and the like, 4-lower alkyl-morpholine, e.g. 4-methyl-morpholine, 4-ethyl-morpholine and the like, 1,4-di-lower alkyl-piperazine, e.g. 1,4-dimethyl-piperazine and the like, or any other suitable aliphatic tertiary amine, as well as heterocyclic aryl compounds containing a tertiary nitrogen atom, e.g. pyridine, collidine and the like, or any other suitable basic reagent.

The alcoholysis may be carried out using the lower alkanol or the lower alkoxy-lower alkanol as the diluent; any other inert solvent, such as, for example, p-dioxane and the like, may be added to ensure complete solution. The reaction is preferably completed at an elevated temperature, if necessary, in a closed vessel, and/or, in the atmosphere of an inert gas, such as nitrogen.

Reaction of the starting material with the lower alkanol or lower alkoxy-lower alkanol, occurs with epimerization at the carbon atom representing the 18-position; thus, a lower alkoxy-lower alkyl 18β-organic sulfonyloxy-allo-yohimbane 16β-carboxylate compound, upon reaction with a lower alkanol or a lower alkoxy-lower alkanol yields the lower alkoxy-lower alkyl 18α-R-allo-yohimbane 16β-carboxylate compound and vice-versa.

The lower alkoxy-lower alkyl 18-organic sulfonyloxy-allo-yohimbane 16β-carboxylates, salts, N-oxides or salts of N-oxides used as the starting materials may be prepared according to known methods, for example, by converting an 18-hydroxy-allo-yohimbane 16β-carboxylic acid compound, for example, the free acid or a lower alkyl ester thereof, into a lower alkoxy-lower alkyl 18-hydroxy-allo-yohimbane 16β-carboxylate, for example, by esterification of the free acid with a lower alkoxy-lower diazo-alkane or transesterification of the lower alkyl ester with a lower alkoxy-lower alkanol, and esterifying the resulting lower alkoxy-lower alkyl 18-hydroxy-allo-yohimbane 16β-carboxylate with an organic sulfonyl halide, for example, benzene sulfonyl chloride, or particularly a benzene sulfonyl chloride, in which the benzene ring is substituted with halogeno, e.g. bromo and the like, nitro, or any other of the above-mentioned suitable substituents, in the presence of a base, particularly an organic tertiary base, e.g. pyridine, collidine and the like. In the esterification step, the base, such as, for example, pyridine and the like, may also serve as the diluent; other suitable inert solvents may be added, if necessary. The reaction is carried out under cooling or at room temperature, preferably while excluding moisture.

The above-described details of the esterification and alcoholysis procedures are also applicable to the methods used for the preparation of starting materials and intermediates used in the previously-described methods for the preparation of the compounds of this invention.

Compounds of this invention may also be formed by etherifying in a lower alkoxy-lower alkyl 18-hydroxy-allo-yohimbane 16β-carboxylate, a salt, an N-oxide or a salt of an N-oxide thereof, the free hydroxyl group attached to the 18-position by treatment with lower diazo-alkane or a lower alkoxy-lower diazo-alkane in the presence of a strong inorganic Lewis acid, and, if desired, carrying out the optional steps.

A salt of the starting material is an acid addition salt, primarily with an inorganic, such as hydrochloric, hydrobromic, sulfuric, phosphoric acid and the like. It may also be a salt with the Lewis acid catalyzing the etherification reaction, e.g. fluoboric acid and the like; such salt may be formed during the reaction.

Fluoboric acid, which may be employed in the form of a concentrated aqueous solution (for example, as an about 12 N to an about 16 N aqueous solution), represents the preferred strong inorganic Lewis acid catalyzing the etherification reaction. Other suitable reagents may be, for example, perchloric acid (preferably in anhydrous form) and the like. Due to its salt forming properties, the Lewis acid is used in excess of one mol, whenever the free base is present as the starting material.

The reaction is carried out in the presence of an organic solvent, which is inert towards the starting material, the diazo reagent and the Lewis acid. Appropriate diluents are, for example, halogenated lower aliphatic hydrocarbons, e.g. methylene chloride, chloroform, ethylene chloride, trichloroethane, tetrachloroethane and the like, ethers, e.g. diethyl ether, tetrahydrofuran and the like, lower alkyl lower alkanoates, e.g. methyl acetate, ethyl acetate and the like, acetonitrile or any other useful solvent, as well as mixtures of solvents.

The reaction may be carried out at room temperature; however, cooling to below room temperature, for example, to from about 10° to about −20°, especially to from about 0° to about −15°, may be advantageous. If necessary, it may be performed in the atmosphere of an inert gas, e.g. nitrogen and the like.

An excess of the diazo reagent present at the end of the reaction may be destroyed, for example, by adding an acid, preferably an easily esterifiable organic carboxylic acid, e.g. acetic, benzoic acid and the like.

The starting materials used in the above procedure may be prepared according to known procedures. For example, a lower alkoxy-lower alkyl 18-hydroxy-3-epi-alloyohimbane 16β-carboxylate may be isomerized to the desired lower alkoxy-lower alkyl 18-hydroxy-allo-yohimbane 16β-carboxylate according to the isomerization method described above.

The details of the above procedure may also be applied to any of the previously-shown methods involving etherification of a free 18-hydroxyl group in starting materials and intermediates.

A further method for preparing the compounds of this invention comprises esterifying in an 18-R-allo-yohimbane 16β-carboxylic acid, in which R has the previously-given meaning, a salt, an N-oxide or a salt of an N-oxide thereof, the free carboxyl group attached to the 16β-position and, if desired, carrying out the optional steps.

The carboxyl group may be esterified according to known methods; for example, the starting material, preferably a solution thereof, may be treated with a lower alkoxy-lower diazo-alkane. The latter is preferably used in solution with an inert solvent, and may be added to the starting material or a solution thereof; suitable solvents are, for example, ethers, e.g. diethylether, tetrahydrofuran and the like, halogenated hydrocarbons, e.g. chloroform, methylenechloride and the like, or any other appropriate solvents. An excess of the diazo-reagent present after the completion of the reaction may be destroyed, for example, by adding an additional carboxylic acid, such as acetic, benzoic acid and the like.

The starting materials used in the above procedure may be prepared, for example, by converting in an 18-hydroxy-allo-yohimbane 16β-carboxylic acid ester, particularly a lower alkyl ester, a salt, an N-oxide or a salt of an N-oxide thereof, the free hydroxyl group attached to the 18-position into a lower alkoxy or a lower alkoxy-lower alkyl group and hydrolizing in a resulting 18-R-allo-yohimbane 16β-carboxylic acid ester the esterified carboxyl group into a free carboxyl group.

Conversion of a free 18-hydroxyl group into an 18-lower alkoxy or an 18-lower alkoxy-lower alkoxy group is carried out according to the previously-described procedure. The hydrolysis of the esterified carboxyl group is carried out according to known methods; for example, the esterified carboxyl group may be cleaved by treatment with an alkali metal hydroxide, e.g. sodium hydroxide, potassium hydroxide and the like, in a lower alkanol, e.g. methanol, ethanol and the like, or preferably, in an aqueous solution of a lower alkanol.

The compounds of the present invention may also be obtained, for example, by converting in an ester of an 18-R-allo-yohimbane 16β-carboxylic acid, in which R has the above-given meaning, a salt, an N-oxide or a salt of an N-oxide thereof, the 16β-carboxylic acid ester group into the desired 16β-carboxylic acid lower alkoxy-lower alkyl ester group, and, if desired, carrying out the optional steps.

The above conversion is a transesterification reaction, which may be carried out, for example, by treating the starting material with a lower alkoxy-lower alkanol, preferably in the presence of a Lewis base as the transesterification reagent. Such reagent is, for example, an alkoxide ion, as, for example, furnished by an alkali metal, e.g. lithium, sodium and the like, lower alkoxy-lower alkanolate, an alkaline earth metal, e.g. barium, strontium and the like, lower alkoxy-lower alkanolate or an aluminum lower alkoxy-lower alkanolate. Individual metal lower alkoxy-lower alkanolate compounds are employed together with the corresponding lower alkoxy-lower alkanol used as the transesterification alcohol. Other Lewis base-type catalysts are, for example, an alkali metal cyanide, e.g. potassium cyanide and the like, a strong quaternary ammonium hydroxide, e.g. benzyltrimethyl-ammonium hydroxide and the like, or any other suitable transesterification catalyst. The transesterification reaction may also be catalyzed by an acidic reagent; an inorganic acid, such as tungstic acid and the like, or an organic acid, such as p-toluene sulfonic acids and the like, may be used for that purpose.

Apart from the transesterifying alcohol, which may simultaneously serve as a diluent, other inert solvents may be used in the above-mentioned transesterification reaction; carbocyclic aryl hydrocarbons, e.g. benzene, toluene and the like, are examples of such inert solvents. Preferably, the reaction may be carried out at an elevated temperature, and, if necessary, under increased pressure and/or in the atmosphere of an inert gas, e.g. nitrogen.

A combination of the above etherification and esterification procedure, which yields lower alkoxy-lower alkyl 18-R-allo-yohimbane 16β-carboxylates, in which the radical etherifying the 18-hydroxyl group and the group esterifying the 16β-carboxyl group are identical (i.e. R stands for a lower alkoxy-lower alkoxy group), salts, N-oxides or salts of N-oxides thereof, comprises reacting an 18-hydroxy-allo-yohimbane 16β-carboxylic acid, a salt, an N-oxide or a salt of an N-oxide thereof, with a lower alkoxy-lower diazo-alkane in the presence of a strong Lewis acid, and isolating the desired compound, and, if desired, carrying out the optional steps.

This reaction may be carried out according to the previously-given method and is catalyzed by the necessary amount of a strong Lewis acid. It may also be carried out in such manner that first the reactive carboxyl group in the 16β-position is esterified. This may be achieved by adding part (one mol or an excess) of the diazo-reagent to the free acid compound, using appropriate solvents, and, after the addition of the Lewis acid to catalyze the etherification, giving to the reaction mixture the additional amount (one mol or an excess) of the diazo-reagent.

The compounds of this invention may also be prepared, for example, by dequaternizing quaternary lower alkoxy-lower alkyl 18-R-allo-yohimbane 16β-carboxylate salts, in which R has the above-given meaning, and, if desired, carrying out the optional steps.

The substituent attached to the quaternary nitrogen atom representing the 4-position, may be an aliphatic hydrocarbon radical, such as, for example, lower alkyl, lower alkenyl, such as allylic lower alkenyl, or any other suitable aliphatic radical, but more especially a substituted aliphatic hydrocarbon radical having as substituting groups, for example, carbocyclic aryl, such as monocyclic or bicyclic carbocyclic aryl, e.g. phenyl, 1-naphthyl, 2-naphthyl and the like, or analogous radicals substituted by additional groups, such as lower alkyl, e.g. methyl, ethyl and the like, lower alkoxy, e.g. methoxy, ethoxy and the like, halogeno, e.g. fluoro, chloro, bromo and the like, nitro, amino, such as N,N-di-lower alkyl-amino, e.g. N,N-dimethylamino and the like, or any other suitable substituent, which does not impede the departure of the whole group attached to the 4-position. Other substituents of a substituted aliphatic hydrocarbon radical may be functional groups, such as, for example, etherified hydroxyl, particularly lower alkoxy having preferably from one to four carbon atoms, such as methoxy, ethoxy, n-propyloxy and the like, carbocyclic aryloxy, particularly monocyclic or bicyclic carbocyclic aryloxy, e.g. phenyloxy and phenyloxy, in which phenyl is substituted by additional substituents, such as those previously-mentioned, carbocyclic aryl-lower aliphatic hydrocarbon-oxy, such as monocyclic or bicyclic carbocyclic aryl-lower alkoxy, e.g. benzyloxy, diphenylmethyloxy and the like, and analogous groups, in which the carbocyclic aryl nucleus contains additional substituents, such as those mentioned above. Other functional groups attached to an aliphatic hydrocarbon radical substituting the quaternary nitrogen atom of the 4-position are, for example, etherified mercapto, such as, for example, lower alkyl-mercapto, e.g. methylmercapto, ethylmercapto and the like, carbocyclic aryl-mercapto, such as monocyclic or bicyclic carbocyclic-mercapto, e.g. phenylmercapto and the like, and phenyl-mercapto, in which phenyl is substituted by substituents, such as those mentioned before, carbocyclic aryl-lower aliphatic hydrocarbon-mercapto, such as monocyclic or bicyclic carbocyclic aryl-lower alkyl-mercapto, e.g. benzylmercapto, diphenylmethyl-mercapto and the like, and analogous groups, in which the carbocyclic aryl radical is substituted by the aforementioned substituents, halogen atoms, e.g. chloro, bromo and the like, carbo-lower alkoxy, e.g. carbomethoxy, carbethoxy and the like, or any other suitable functional group.

The aliphatic hydrocarbon groups, to which the above-mentioned substituents are added, are primarily lower alkylene radicals, above all, methylene, as well as 1,1-ethylene, 1,2-ethylene, 1,1-propylene and the like. Preferred substituted aliphatic hydrocarbon radicals attached to the quaternary nitrogen atom of the 4-position are, for example, monocyclic carbocyclic aryl-lower alkyl, particularly monocyclic carbocyclic aryl-methyl, e.g. benzyl, diphenylmethyl, trityl and the like, or 1-monocyclic carbocyclic aryl-ethyl, e.g. 1-phenyl-ethyl and the like, lower alkoxy-lower alkyl, particularly lower alkoxy-methyl, e.g. methoxymethyl, ethoxymethyl, n-propyloxy-methyl, isopropyloxymethyl and the like, monocyclic carbocyclic aryl-lower alkoxy-lower alkyl, particularly monocyclic carbocyclic aryl-lower alkoxy-methyl, e.g. benzyloxymethyl and the like, lower alkyl-mercapto-lower alkyl, particularly lower alkyl-mercaptomethyl, e.g. methylmercaptomethyl, ethylmercaptomethyl and the like, monocyclic carbocyclic aryl-lower alkyl-mercapto-lower alkyl, especially monocyclic carbocyclic aryl-lower alkyl-mercaptomethyl, e.g. benzylmercaptomethyl and the like, halogeno-lower alkyl, primarily halogeno-methyl, e.g. chloromethyl, bromomethyl and the like, carbo-lower alkoxy-lower alkyl, particularly carbo-lower alkoxy-methyl, e.g. carbomethoxymethyl, carbethoxymethyl and the like.

The anion of the quaternary salts used as the starting materials stands primarily for the anion of a strong inorganic acid, e.g. hydrochloric, hydrobromic, hydriodic, sulfuric, fluoboric acid and the like, or of a strong organic, particularly organic sulfonic, acid, e.g. p-toluene sulfonic acid and the like.

Dequaternization, which involves removal of the group attached to the quaternary nitrogen atom of the 4-position, may be achieved according to methods, the selection of which depends primarily on the nature of this group. For example, monocyclic carbocyclic aryl-methyl or 1-monocyclic carbocyclic aryl-ethyl groups, such as benzyl, diphenylmethyl, trityl, 1-phenylethyl and the like, as well as monocyclic carbocyclic aryl-lower alkoxymethyl, e.g. benzyloxymethyl, diphenylmethoxymethyl and the like, or any other analogous substituent, may be removed by hydrogenolysis, for example by treatment with hydrogen in the presence of a catalyst containing a metal of the eighth group of the periodic system, e.g. nickel, palladium and the like. Other groups, for example, etherified hydroxy-methyl, such as lower alkoxymethyl, e.g. methoxymethyl and the like, or any other etherified hydroxy-methyl group, e.g. benzyloxymethyl and the like, halogenomethyl, e.g. chloromethyl and the like, carbo-lower alkoxymethyl, e.g. carbomethoxymethyl, carbethoxymethyl and the like, may be removed by hydrolysis, for example, by treatment with a dilute inorganic acid, such as, for example, hydrochloric, sulfuric acid and the like. Still other groups, particularly etherified mercaptomethyl, such as lower alkyl-mercaptomethyl, e.g. methylmercaptomethyl, ethylmercaptomethyl and the like, carbocyclic aryl-mercaptomethyl, particularly monocyclic aryl-mercaptomethyl, e.g. phenylmercaptomethyl and the like, or carbocyclic aryl-lower aliphatic hydrocarbon-mercaptomethyl, such as monocyclic carbocyclic aryl-lower alkyl-mercaptomethyl, e.g. benzylmercaptomethyl and the like, may be removed by desulfurization in the presence of a hydrogenation catalyst, particularly a catalyst containing a metal of the eighth group of the periodic system, e.g. Raney nickel, palladium black and the like. Other groups may be removed by heating the quaternary compound.

The starting materials used in the above procedure may be obtained according to different methods. For example, a lower alkoxy-lower alkyl 18-hydroxy-allo-yohimbane 16β-carboxylate or a salt thereof, may be treated with a reactive ester of an aliphatic hydroxy-hydrocarbon compound or a reactive ester of a substituted aliphatic hydroxy-hydrocarbon compound, and the 18-hydroxyl group in a resulting quaternary lower alkoxy-lower alkyl 18-hydroxy-allo-yohimbane 16β-carboxylate salt, which has an aliphatic hydrocarbon or a substituted aliphatic hydrocarbon radical attached to the nitrogen atom of the 4-position, may then be etherified to form the desired starting materials.

Reactive esters of aliphatic hydroxy-hydrocarbon or substituted aliphatic hydroxy-hydrocarbon compounds are particularly those with strong inorganic acids, e.g. hydrochloric, hydrobromic, hydriodic, sulfuric acid and the like, or with strong organic acids, such as organic sulfonic acids, e.g. p-toluene sulfonic acid and the like. The reaction is carried out in the absence or presence of an inert solvent, if necessary, while cooling or at an elevated temperature, under pressure and/or in the atmosphere of an inert gas, e.g. nitrogen.

A free 18-hydroxyl group in a resulting quaternary compound may be etherified according to any of the previously-shown methods, for example, by treatment with a lower diazo-alkane or lower alkoxy-lower diazo-alkane, if necessary, in the presence of a strong Lewis acid, such as fluoboric acid and the like, or any other agent capable of etherifying a secondary hydroxyl group.

Quaternization of a lower alkoxy-lower alkyl 18-hydroxy-allo-yohimbane 16β-carboxylate or a salt thereof may also occur by treatment with a lower diazo-alkane or a lower alkoxy-lower diazo-alkane. If carried out in the presence of a Lewis acid, such as, for example, fluoboric acid and the like, the free hydroxyl group attached to the 18-position may be etherified simultaneously.

In the lower alkoxy-lower alkyl 18-R-allo-yohimbane 16β-carboxylates resulting from the above procedures, in which R has the previously-given meaning, the 16β-carboxylic acid lower alkoxy-lower alkyl ester group may be converted into another 16β-carboxylic acid lower alkoxy-lower alkyl ester group, either by hydrolysis and subsequent re-esterification or by transesterification; details of these procedures have been given hereinbefore.

The compounds of this invention or the N-oxides thereof may be obtained in the form of the free bases or as the salts thereof. A salt, including a salt of an N-oxide, may be converted into the free compound, for example, by reacting the former with an alkaline reagent, such as, for example, silver oxide, aqueous ammonia and the like, or a hydroxyl ion exchange resin.

A resulting salt may be converted into another salt, for example, by reacting it with a suitable metal, e.g. sodium, potassium, silver and the like, salt of an acid, with an anion exchange resin or any other suitable preparation.

A free compound or an N-oxide thereof may be converted into an acid addition salt thereof by treatment with an inorganic or organic acid, such as one of those mentioned before; the reaction may be carried out, for example, by treating a solution of the free compound in a solvent or solvent mixture with the acid or a solution thereof and isolating the resulting salt. The salts may also be obtained as the hemihydrates, monohydrates, sesquihydrates or polyhydrates depending on the conditions used in the formation of the salts.

N-oxides of the compounds of the present invention may be formed according to known methods. For example, a resulting compound, preferably a solution thereof in an inert solvent, may be reacted with an N-oxidizing reagent, such as, for example, hydrogen peroxide, ozone, persulfuric acid, or more especially, an organic peracid, such as an organic percarboxylic acid, e.g. peracetic, perbenzoic, monoperphthalic acid and the like, or a persulfonic acid, e.g. p-toluene persulfonic acid and the like. Inert solvents used in the preparation of the N-oxides are, for example, halogenated lower alkanes, e.g. methylene chloride, chloroform, ethylene chloride and the like, lower alkanols, e.g. methanol, ethanol and the like, or any other suitable solvent. In the N-oxidation reaction an excess of the oxidation reagent and/or an increase in temperature should be avoided in order to prevent oxidative degradation.

N-oxides may be converted into the free compounds according to known reduction procedures, for example, by treatment with hydrogen in the presence of a catalyst, which contain a metal of the eighth group of the periodic system, such as nickel, platinum, palladium and the like, e.g. Raney nickel, platinum oxide and the like, with nascent hydrogen, as generated, for example, by heavy metals, e.g. iron, zinc, tin and the like, in the presence of acids, e.g. acetic acid and the like, or with any other appropriate reducing reagent or method.

The compounds of the present invention, as well as the starting materials and intermediates used in their formation, may be present in the form of mixtures of racemates, single racemates or antipodes.

Mixtures of racemates may be separated into the single racemates on the basis of physico-chemical difference, for example, by fractionated crystallization and the like.

Racemates may be resolved into antipodes. Those forming acid addition salts may be resolved, for example, by treating a solution of the free racemic compound in an inert solvent with one of the optically active forms of an acid containing an asymmetric carbon atom or a solution thereof. Especially useful as optically active forms of salt-forming acids having an asymmetric carbon atom are D-tartaric acid (l-tartaric acid) and L-tartaric acid (or d-tartaric acid), as well as the optically active forms of di-o-toluyl-tartaric, malic, mandelic, camphor-10-sulfonic, quinic acid and the like. A salt may then be isolated, which is formed by the optically active acid with one of the optically active forms of the base. A resulting salt may be converted into the free and optically active compounds according to known methods, and a resulting optically active compound may be converted into an acid addition salt or into an N-oxide or an acid addition salt of an N-oxide thereof as shown hereinabove. The optically active forms may also be obtained by resolving racemates using biochemical methods.

The invention also comprises any modification of the process wherein a compound obtainable as an intermediate at any stage of the process is used as starting material and the remaining step(s) of the process is(are) carried out. It also includes any new intermediates, which may be formed in one of the procedures outlined hereinbefore.

In the process of this invention such starting materials are preferably used which lead to final products mentioned in the beginning as preferred embodiments of the invention.

This application is a continuation-in-part application of our application Serial No. 110,322 of May 16, 1961, now abandoned, which in turn is a continuation-in-part application of our application Serial No. 84,519, filed January 24, 1961, now abandoned, which in turn is a continuation-in-part application of our application Serial No. 73,494, filed December 5, 1960, which in turn is a continuation-in-part application of our application Serial No. 46,875, filed August 2, 1960, now abandoned, which in turn is a continuation-in-part application of our application Serial No. 37,097, filed June 20, 1960, which in turn is a continuation-in-part application of our application Serial No. 837,357, filed September 1, 1959, now abandoned, which in turn is a continuation-in-part application of our application Serial No. 830,187, filed July 29, 1959, now abandoned. The previously-mentioned application Serial No. 84,519, filed January 24, 1961, is also a continuation-in-part application of our application Serial No. 73,490, filed December 5, 1960, now abandoned, which in turn is a continuation-in-part application of our application Serial No. 46,911, filed August 2, 1960, now abandoned.

The following examples illustrate the invention and are not to be construed as being limitations thereof. Temperatures are given in degrees Centigrade.

*Example 1*

A solution of 1.0 g. of crude 2-methoxyethyl 18-epi-O-(2-methoxyethyl)-3-dehydro-reserpate in 75 ml. of methanol is cooled in an ice-water bath, and a total of 1.0 g. of sodium borohydride is added in small portions over a period of one-half hour. The reaction mixture is allowed to stand for an additional one-half hour; an excess of water is added, and the organic material is extracted with methylene chloride. The organic solution is dried over sodium sulfate and evaporated to dryness. The residue is crystallized from diethyl ether; the first crop is recrystallized from methanol and the second crop from diethyl ether to yield a total of 0.5 g. of 2-methoxyethyl 18-epi-O-(2-methoxyethyl)-3-iso-reserpate of the formula:

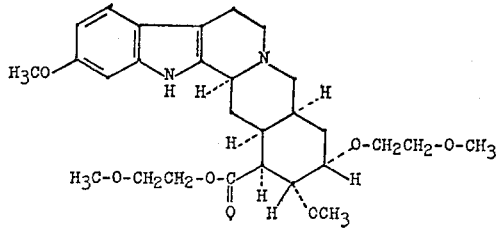

which melts at 154–157°; $[\alpha]_D^{25} = -18°$ (in chloroform).

The starting material may be prepared as follows: A mixture of 50.0 g. of methyl reserpate and 3.4 ml. of benzyl-trimethyl-ammonium hydroxide in 400 ml. of 2-methoxyethanol is heated on the steam bath for 1½ hours. The resulting solution is evaporated under reduced pressure, the residue is dissolved in 200 ml. of methylene chloride, and the organic solution is washed twice with 3 percent aqueous ammonia and twice with a saturated aqueous solution of sodium chloride. The solution is concentrated, any solid material is filtered off, and the remainder of the solvent is stripped off. The residue is crystallized twice from ethyl acetate to yield 24.0 g. of 2-methoxyethyl reserpate, M.P. 177–180°.

A mixture of 3.0 g. of 2-methoxyethyl reserpate and 4.2 g. of 4-bromo-benzene sulfonyl chloride in 35 ml. of dry pyridine is cooled in an ice-water bath and is then allowed to stand at room temperature in the dark for two days. The reaction mixture is poured into ice-water and the organic material is extracted with methylene chloride; the organic solution is washed twice with a five percent aqueous sodium carbonate solution, with water and a saturated aqueous sodium chloride solution, dried over sodium sulfate and evaporated to a small volume. Toluene is added, the solvents are stripped off, and the residue is dissolved in methylene chloride. This solution is filtered through charcoal, the solvent is evaporated and the residue is recrystallized from benzene to yield the desired 2-methoxyethyl 18-O-(4-bromo-phenyl-sulfonyl)-reserpate, M.P. 185–187°; $[\alpha]_D^{26}=-76°$ (in chloroform); yield: 3.0 g.

A mixture of 3.0 g. of 2-methoxyethyl-18-O-(4-bromo-phenyl-sulfonyl)-reserpate, 0.45 g. of N,N,N-trimethyl-amine and 200 ml. of 2-methoxyethanol is heated in a sealed bottle on the steam bath for eleven days. The excess 2-methoxyethanol is evaporated under reduced pressure, the residue is dissolved in methylene chloride, and the organic solution is washed twice with five percent aqueous sodium carbonate and once with saturated aqueous sodium chloride. The methylene chloride solution is washed, is dried over sodium sulfate and the solvent is evaporated under reduced pressure and the residue is crystallized on addition of diethyl ether. The solid material is filtered off and redissolved in methylene chloride; the organic solution is passed through a charcoal preparation and evaporated. The desired 2-methoxyethyl 18-epi-O-(2-methoxyethyl)-reserpate is crystallized from diethyl ether and melts at 144–147°, $[\alpha]_D^{24}=-22°$ (in chloroform); yield: 1.4 g.

To a mixture of 1.0 g. of 2-methoxyethyl 18-epi-O-(2-methoxyethyl)-reserpate in 20 ml. of acetic acid and 40 ml. of water is added a solution of 0.36 g. of potassium dichromate in 20 ml. of water. The reaction mixture is allowed to stand at room temperature for one hour; an excess of water is added and the aqueous solution is made alkaline with aqueous ammonia, whereupon a solid material precipitates. The organic material is extracted with methylene chloride, the solution is dried over sodium sulfate and evaporated to dryness to yield 1.0 g. of the crude 2-methoxyethyl 18-epi-O-(2-methoxyethyl)-3-dehydro-reserpate as a foam, which is used without further purification.

*Example 2*

The solvent from a solution of 0.44 g. of 2-methoxyethyl 18-epi-O-(2-methoxyethyl)-3-iso-reserpate and 0.95 ml. of 1 N hydrochloric acid in 20 ml. of water is removed by freeze-drying (lyophylization). The residue is dried in a desiccator to yield 0.475 g. of the 2-methoxyethyl 18-epi-O-(2-methoxyethyl)-3-iso-reserpate hydrochloride dihydrate, M.P. 172–177°.

*Example 3*

To a solution of 4.0 g. of 2-methoxyethyl 18-epi-O-(2-methoxyethyl)-3-iso-reserpate in 50 ml. of acetone is added 0.899 g. of maleic acid in 10 ml. of acetone, and the mixture is cooled in the ice bath. 50 ml. of diethyl ether is added, and the crystalline material is filtered off, and washed on the filter with diethyl ether to yield 4.3 g. of 2-methoxyethyl 18-epi-O-(2-methoxyethyl)-3-iso-reserpate maleate, M.P. 202–204°.

*Example 4*

A mixture of 4.0 g. of 2-methoxyethyl 18-epi-O-(2-methoxyethyl)-3-iso-reserpate in 30 ml. of acetone and 0.38 g. of sulfuric acid in 5 ml. of acetone is cooled in an ice bath. 50 ml. of diethyl ether is added and the crystalline precipitate is filtered off and washed with diethyl ether to yield 3.2 g. of 2-methoxyethyl 18-epi-O-(2-methoxyethyl)-3-iso-reserpate sulfate, M.P. 138–150° (mainly the hemisulfate dihydrate).

*Example 5*

To a mixture of 0.9 g. of 2-methoxyethyl 18-epi-O-(2-ethoxyethyl)-3-dehydro-reserpate in 50 ml. of methanol, cooled in an ice bath is added 1.0 g. of sodium borohydride in small amounts over a period of thirty minutes. The reaction mixture is allowed to stand for an additional thirty minutes and is then diluted with 400 ml. of water. The organic material is extracted with two portions of 100 ml. of methylene chloride, the combined organic solution is filtered through a short column containing a diatomaceous earth preparation and is then evaporated to dryness. The residue is crystallized from a mixture of diethyl ether and petroleum ether to yield 0.675 g. of 2-methoxyethyl 18-epi-O-(2-ethoxyethyl)-3-iso-reserpate of the formula:

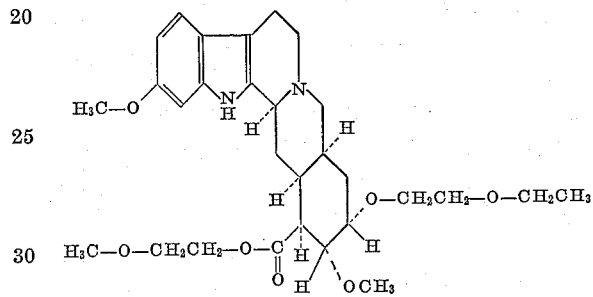

which is recrystallized from the same solvent mixture, M.P. 134–136°; $[\alpha]_D^{24}=-18°$ (chloroform).

A mixture of 0.45 g. of 2-methoxyethyl 18-epi-O-(2-ethoxyethyl)-3-iso-reserpate, 12 ml. of water and 1 ml. of 1 N hydrochloric acid is lyophylized at room temperature to yield 0.48 g. of 2-methoxyethyl 18-epi-O-(2-ethoxyethyl)-3-iso-reserpate hydrochloride dihydrate, M.P. 160–164°.

The starting material may be prepared as follows: To a mixture of 2-methoxy-ethyl 18-epi-O-(2-ethoxyethyl)-reserpate (M.P. 123–125°, prepared by converting 2-methoxyethyl reserpate into its 3-nitro-phenyl-sulfonyl ester and reacting the later with 2-ethoxyethanol in the presence of N,N,N-triethylamine) in a mixture of 20 ml. of acetic acid and 40 ml. of water is added 0.36 g. of potassium dichromate in 20 ml. of water. The mixture is allowed to stand at room temperature for one hour, diluted with 500 ml. of water and made basic to pH 9–10 with aqueous ammonia. The organic material is extracted with methylene chloride, the organic solution is dried over sodium sulfate and evaporated to dryness. The resulting crude 2-methoxyethyl 18-epi-O-(2-ethoxyethyl)-3-dehydro-reserpate is used without further purification.

Other lower alkoxy-lower alkyl 18-epi-O-lower alkoxy-lower alkyl-3-iso-reserpates, in which lower alkyl has from two to three carbon atoms and separates lower alkoxy having from one to four carbon atoms, from the 16β-carboxyl group and the 18α-oxygen atom, respectively, by from two to three carbon atoms, and which may be prepared according to the previously-described procedure, are for example, 2-methoxyethyl 18-epi-O-(2-n-propyloxyethyl)-3-iso-reserpate,
2-methoxyethyl 18-epi-O-(2-isopropyloxyethyl)-3-iso-reserpate,
2-methoxyethyl 18-epi-O-(2-methoxypropyl)-3-iso-reserpate,
2-ethoxyethyl 18-epi-O-(2-methoxyethyl)-3-iso-reserpate,
2-ethoxyethyl 18-epi-O-(2-ethoxyethyl)-3-iso-reserpate,
2-ethoxyethyl 18-epi-O-(3-methoxypropyl)-3-iso-reserpate,
2-n-propyloxyethyl 18-epi-O-(2-methoxyethyl)-3-iso-reserpate, 2-isopropyloxyethyl 18-epi-O-(2-ethoxyethyl)-3-iso-reserpate,
2-methoxypropyl 18-epi-O-(2-methoxyethyl)-3-iso-reserpate,
2-methoxypropyl 18-epi-O-(2-ethoxyethyl)-3-iso-reserpate,
3-methoxypropyl 18-epi-O-(2-methoxyethyl)-3-iso-reserpate,
3-ethoxypropyl 18-epi-O-(3-methoxypropyl)3-iso-reserpate and the like, or pharmaceutically acceptable acid addition salts, such as the hydrochlorides, sulfates, maleates and the like, of these compounds.

Other lower alkoxy-lower alkyl 18α-lower alkoxy-lower alkoxy-allo-yohimbane 16β-carboxylates, which may be prepared according to the previously-described procedures are, for example, lower alkoxy-lower alkyl 18-epi-O-lower alkoxy-lower alkyl-9-methoxy-3-iso-deserpidates, e.g.

2-methoxyethyl 9-methoxy-18-epi-O-(2-methoxyethyl)-3-iso-deserpidate,
2methoxyethyl 18-epi-O-(2-ethoxyethyl)-9-methoxy-3-iso-deserpidate,
2-ethoxyethyl 9-methoxy-18-epi-O-(2-methoxyethyl)-3-iso-deserpidate,
2-ethoxyethyl 9-methoxy-18-epi-O-(3-methoxypropyl)-3-iso-deserpidate and the like, lower alkoxy-lower alkyl 18-epi-O-lower alkoxy-lower alkyl-10-methoxy-deserpidates, e.g.

2-methoxyethyl 10-methoxy 18-epi-O-(2-methoxyethyl)-3-iso-deserpidate,
2-methoxyethyl 18-epi-O-(2-ethoxyethyl)-10-methoxy-3-iso-deserpidate,
2-methoxyethyl 18-epi-O-(2-ethoxypropyl)-10-methoxy-3-iso-deserpidate,
2-methoxyethyl-10-methoxy-18-epi-O-(3-methoxypropyl)-3-iso-deserpidate,
2-ethoxy-ethyl 10-methoxy-18-epi-O-(2-methoxyethyl)-3-iso-deserpidate,
2-methoxypropyl 10-methoxy-18-epi-O-(2-methoxyethyl)-3-iso-deserpidate,
3-methoxypropyl 10-methoxy-18-epi-O-(2-methoxyethyl)-3-iso-deserpidate and the like, lower alkoxy-lower alkyl 11-ethoxy-18-epi-O-lower alkoxy-lower alkyl-3-iso-deserpidates, e.g.

2-methoxyethyl 11-ethoxy-18-epi-O-(2-methoxyethyl)-3-iso-deserpidate,
2-methoxyethyl 11-ethoxy-18-epi-O-(2-ethoxyethyl)-3-iso-deserpidate and the like, lower alkoxy-lower alkyl 18-epi-O-lower alkoxy-lower alkyl-11-n-propyloxy-3-iso-deserpidates, e.g.

2-methoxyethyl 18-epi-O-(2-methoxyethyl)-11-n-propyloxy-3-iso-deserpidate,
2-ethoxyethyl 18-epi-O-(2-methoxyethyl)-11-n-propyloxy-3-iso-deserpidate and the like, lower alkoxy-lower alkyl 11-isopropyloxy-18-epi-O-lower alkoxy-lower alkyl-3-iso-deserpidates, e.g.

2-methoxyethyl 11-isopropyloxy-18-epi-O-(2-methoxyethyl)-3-iso-deserpidate,
2-methoxyethyl 11-isopropyloxy-18-epi-O-(2-ethoxyethyl)-3-iso-deserpidate and the like, lower alkoxy-lower alkyl 11-n-butyloxy-18-epi-O-lower alkoxy-lower alkyl-3-iso-deserpidates, e.g.

2-methoxyethyl 11-n-butyloxy-18-epi-O-(2-methoxyethyl)-3-iso-deserpidate,
2-methoxyethyl 11-n-butyloxy-18-epi-O-(2-n-propyloxyethyl)-3-iso-deserpidate and the like, lower alkoxy-lower alkyl 18-epi-O-lower alkoxy-lower alkyl-12-methoxy-3-iso-deserpidates, e.g.

2-methoxyethyl 12-methoxy-18-epi-O-(2-methoxyethyl)-3-iso-deserpidate,
2-ethoxyethyl 12-methoxy-18-epi-O-(2-methoxyethyl)-3-iso-deserpidate and the like, lower alkoxy-lower alkyl 18-epi-O-lower alkoxy-lower alkyl-3-iso-deserpidates, e.g.

2-methoxyethyl 18-epi-O-(2-methoxyethyl)-3-iso-deserpidate,
2-methoxyethyl 18-epi-O-(2-ethoxyethyl)3-iso-deserpidate,
2-methoxyethyl 18-epi-O-(2-methoxypropyl)-3-iso-deserpidate,
2-methoxyethyl-18-epi-O-(3-methoxypropyl)-3-iso-deserpidate,
2-methoxyethyl 18-epi-O-(3-ethoxypropyl)-3-iso-deserpidate,
2-ethoxyethyl 18-epi-O-(2-methoxyethyl)-3-iso-deserpidate,
2-ethoxyethyl 18-epi-O-(2-ethoxyethyl)-3-iso-deserpidate,
2-n-propyloxyethyl 18-epi-O-(2-methoxyethyl)-3-iso-deserpidate,
2-n-butyloxyethyl 18-epi-O-(2-methoxyethyl)-3-iso-deserpidate,
2-methoxypropyl 18-epi-O-(2-methoxyethyl)-3-iso-deserpidate,
2-methoxypropyl 18-epi-O-(2-ethoxyethyl)-3-iso-deserpidate,
3-methoxypropyl 18-epi-O-(2-methoxyethyl)-3-iso-deserpidate,
3-ethoxypropyl 18-epi-O-(2-methoxyethyl)-3-iso-deserpidate and the like, or lower alkoxy-lower alkyl 18-epi-O-lower alkoxy-lower alkyl-3-iso-deserpidates, in which the 5-position, the 6-position, the 9-position, the 10-position or the 11-position is substituted by methyl, or in which the 10-position or the 11-position is substituted by benzyloxy or by fluoro, chloro or bromo, or simultaneously by methylenedioxy, or in which the 9- and 12-positions or the 11- and 12-positions each have a chloro atom, or in which the 11-position is substituted by lower alkyl-mercapto, e.g. methylmercapto, ethylmercapto and the like, or in which the 17α-methoxy group is replaced by another alkoxy group, e.g. ethoxy, n-propyloxy, isopropyloxy and the like, by cyano or by N-acetyl-N-methyl-amino, or lower alkoxy-lower alkyl 18-epi-O-lower alkoxy-lower alkyl-3-iso-reserpates, in which the 5-position or the 6-position is substituted by methyl, or in which the 10-position is substituted by methoxy or the 9- and the 10-positions each have a methoxy group, or in which the 10-position carries chloro or bromo, or in which the 17α-methoxy group is replaced by another lower alkoxy group, e.g. ethoxy, n-propyloxy, isopropyloxy and the like, by cyano or by N-acetyl-N-methyl-amino or pharmaceutically acceptable, non-toxic acceptable, non-toxic addition salts of such compounds.

In the above lower alkoxy-lower alkyl 18-epi-O-lower alkoxy-lower alkyl-3-iso-reserpates and lower alkoxy-lower alkyl 18-epi-O-lower alkoxy-lower alkyl-3-iso-deserpidates lower alkyl has from two to three carbon atoms, and separates lower alkoxy, having from one to four carbon atoms, by from two to three carbon atoms from the 16β-carboxyl group and the 18α-oxygen atom, respectively; the compounds are prepared according to any of the previously-shown procedures, particularly the method shown in the above examples.

Another group of lower alkoxy-lower alkyl 18-lower alkoxy-lower alkoxy-allo-yohimbane 16β-carboxylates is represented by the lower alkoxy-lower alkyl 18-O-lower alkoxy-lower alkyl-3-iso-reserpates, in which lower alkyl has from two to three carbon atoms and separates lower alkoxy, having from one to four carbon atoms, from the 16β-carboxyl group and the 18β-oxygen atom respectively, by from two to three carbon atoms, e.g.

2-methoxyethyl 18-O-(2-methoxyethyl)-3-iso-reserpate,
2-methoxyethyl 18-O-(2-ethoxyethyl)-3-iso-reserpate,
2-methoxyethyl 18-O-(3-methoxypropyl)-3-iso-reserpate,
2-methoxyethyl 18-O-(2-isopropyloxyethyl)-3-iso-reserpate,
2-methoxyethyl 18-O-(2-ethoxypropyl)-3-iso-reserpate,
2-ethoxyethyl 18-O-(2-methoxyethyl)-3-iso-reserpate,
2-ethoxyethyl 18-O-(2-ethoxyethyl)-3-iso-reserpate, 2-ethoxyethyl 18-O-(3-methoxypropyl)-3-iso-reserpates,
2-n-propyloxyethyl 18-O-(2-methoxyethyl)-3-iso-reserpate,
2-isopropyloxyethyl 18-O-(2-ethoxyethyl)-3-iso-reserpate,
2-methoxypropyl 18-O-(2-methoxyethyl)-3-iso-reserpate,
2-methoxypropyl 18-O-(2-ethoxyethyl)-3-iso-reserpate,
3-ethoxypropyl 18-O-(3-methoxypropyl)-3-iso-reserpate and the like, or pharmaceutically acceptable acid addition salts of these compounds.

Other lower alkoxy-lower alkyl 18β-lower alkoxy-lower alkyl-allo-yohimbane 16β-carboxylates are, for example, lower alkoxy-lower alkyl 18-O-lower alkoxy-lower alkyl-9-methoxy-3-iso-deserpidates, e.g.
2-methoxyethyl 9-methoxy-18-O-(2-methoxyethyl)-3-iso-deserpidate,
2-methoxyethyl 18-O-(2-ethoxyethyl)-9-methoxy-3-iso-deserpidate,
2-ethoxyethyl 9-methoxy-18-O-(2-methoxyethyl)-3-iso-deserpidate,
2-ethoxyethyl 9-methoxy-18-O-(3-methoxypropyl)-3-iso-deserpidate and the like,
lower alkoxy-lower alkyl 18-O-lower alkoxy-lower alkyl-10-methoxy-3-iso-deserpidates, e.g.
2-methoxyethyl 10-methoxy-18-O-(2-methoxyethyl)-3-iso-deserpidate,
2-methoxyethyl 18-O-(2-ethoxyethyl)-10-methoxy-3-iso-deserpidate,
2-methoxyethyl 18-O-(2-ethoxypropyl)-10-methoxy-3-iso-deserpidate,
2-methoxyethyl 10-methoxy-18-O-(3-methoxypropyl)-3-iso-deserpidate,
2-ethoxyethyl 10-methoxy-18-O-(2-methoxyethyl)-3-iso-deserpidate,
2-methoxypropyl 10-methoxy-18-O-(2-methoxyethyl)-3-iso-deserpidate,
3-methoxypropyl 10-methoxy-18-O-(2-methoxyethyl)-3-iso-deserpidate and the like,
lower alkoxy-lower alkyl 11-ethoxy-18-O-lower alkoxy-lower alkyl-3-iso-deserpidates, e.g.
2-methoxyethyl 11-ethoxy-18-O-(2-methoxyethyl)-3-iso-deserpidate,
2-methoxyethyl 11-ethoxy-18-O-(2-ethoxyethyl)-3-iso-deserpidate and the like,
lower alkoxy-lower alkyl 18-O-lower alkoxy-lower alkyl-11-n-propyloxy-3-iso-deserpidates, e.g.
2-methoxyethyl 18-O-(2-methoxyethyl)-11-n-propyloxy-3-iso-deserpidate,
2-ethoxyethyl 18-O-(2-methoxyethyl)-11-n-propyloxy-3-iso-deserpidate and the like,
lower alkoxy-lower alkyl 11-isopropyloxy-18-O-lower alkoxy-lower alkyl-3-iso-deserpidates, e.g.
2-methoxyethyl 11-isopropyloxy-18-O-(2-methoxyethyl)-3-iso-deserpidate,
2-methoxyethyl 18-O-(2-ethoxyethyl)-11-iso-propyloxy-3-iso-deserpidate and the like,
lower alkoxy-lower alkyl 11-n-butyloxy-18-O-lower alkoxy-lower alkyl-3-iso-deserpidates, e.g.
2-methoxyethyl 11-n-butyloxy-18-O-(2-methoxyethyl)-3-iso-deserpidate,
2-methoxyethyl 11-n-butyloxy-18-O-(2-n-propyloxyethyl)-3-iso-deserpidate and the like,
lower alkoxy-lower alkyl 18-O-lower alkoxy-lower alkyl-12-methoxy-3-iso-deserpidates, e.g.
2-methoxyethyl 12-methoxy-18-O-(2-methoxyethyl)-3-iso-deserpidate,
2-ethoxyethyl 12-methoxy-18-O-(2-methoxyethyl)-3-iso-deserpidate and the like,
lower alkoxy-lower alkyl 18-O-lower alkoxy-lower alkyl-3-iso-deserpidates, e.g.
2-methoxyethyl 18-O-(2-methoxyethyl)-3-iso-deserpidate,
2-methoxyethyl 18-O-(2-ethoxyethyl)-3-iso-deserpidate,
2-methoxyethyl 18-O-(2-methoxypropyl)-3-iso-deserpidate,
2-methoxyethyl 18-O-(3-methoxypropyl)-3-iso-deserpidate,
2-methoxyethyl 18-O-(3-ethoxypropyl)-3-iso-deserpidate,
2-ethoxyethyl 18-O-(2-methoxyethyl)-3-iso-deserpidate,
2-ethoxyethyl 18-O-(2-ethoxyethyl)-3-iso-deserpidate,
2-n-propyloxyethyl 18-O-(2-methoxyethyl)-3-iso-deserpidate,
2-n-butyloxyethyl 18-O-(2-methoxyethyl)-3-iso-deserpidate,
2-methoxypropyl 18-O-(2-methoxyethyl)-3-iso-deserpidate,
2-methoxypropyl 18-O-(2-ethoxyethyl)-3-iso-deserpidate,
3-methoxypropyl 18-O-(2-methoxyethyl)-3-iso-deserpidate,
3-ethoxypropyl 18-O-(2-methoxyethyl)-3-iso-deserpidate and the like, or lower alkoxy-lower alkyl 18-O-lower alkoxy-lower alkyl-3-iso-deserpidates, in which the 5-position, the 6-position, the 9-position, the 10-position or the 11-position is substituted by methyl, or in which the 10-position or the 11-position is substituted by benzyloxy or by fluoro, chloro or bromo, or simultaneously by methylenedioxy, or in which the 9- and 12-positions or the 11- and 12-positions each have a chloro atom, or in which the 11-position is substituted by lower alkyl-mercapto, e.g. methylmercapto, ethylmercapto and the like, or in which the 17α-methoxy group is replaced by another alkoxy group, e.g. ethoxy, n-propyloxy, isopropyloxy and the like, by cyano or by N-acetylamino-N-methyl, or lower alkoxy-lower alkyl 18-O-lower alkoxy-lower alkyl-3-iso-reserpates, in which the 5-position or the 6-position is substituted by methyl, or in which the 10-position is substituted by methoxy or the 9- and 10-positions each have a methoxy group, or in which the 10-position carries chloro or bromo, or in which the 17α-methoxy group is replaced by another lower alkoxy group, e.g. ethoxy, n-proploxy, isopropyloxy and the like, by cyano or by N-acetyl-N-methyl-amino, or pharmaceutically acceptable, non-toxic addition salts of such compounds. In the above lower alkoxy-lower alkyl 18-O-lower alkoxy-lower alkyl-3-iso-reserpates and lower alkoxy-lower alkyl 18-O-lower alkoxy-lower alkyl-3-iso-deserpidates, lower alkyl has from two to three carbon atoms, and separates lower alkoxy having from one to four carbon atoms, by from two to three carbon atoms from the 16β-carboxyl group and the 18α-oxygen atom, respectively; the compounds are prepared according to any of the previously-shown procedures, particularly the method shown in the above examples.

*Example 6*

A solution of 0.9 g. of 2-methoxyethyl 18-epi-O-ethyl-3-dehydro-reserpate in 50 ml. of methanol is cooled in an icewater bath, and 1.0 g. of sodium borohydride is added in small portions over a period of thirty minutes. The reaction mixture is allowed to stand for an additional thirty minutes and is then diluted with 400 ml. of water. The organic material is extracted with methylene chloride, the organic solution is filtered through a diatomaceous earth preparation and then evaporated to dryness. The residue is crystallized from methanol to yield the 2-methoxyethyl 18-epi-O-ethyl-3-iso-reserpate of the formula:

which is purified by recrystallization from a mixture of diethyl ether and petroleum ether, M.P. 172–174°; $[\alpha]_D^{24} = -19°$ (chloroform); yield: 0.635 g.

A solution of 0.6 g. of 2-methoxyethyl 18-epi-O-ethyl-3-iso-reserpate and 1,35 ml. of 1 N hydrochloric acid in 12 ml. of water is lyophilized and the resulting 2-methoxyethyl 18-epi-O-ethyl-3-iso-reserpate hydrochloride is dried over phosphorus pentoxide to the sesquihydrate, M.P. 181–185°.

The starting material is prepared according to the following procedure: To a solution of 1.0 g. of 2-methoxyethyl 18-epi-O-ethyl-reserpate (M.P. 207–207.5°; prepared by reacting 2-methoxyethyl 18-O-(4-bromo-phenylsulfonyl)-reserpate with ethanol in the presence of N,N,N-triethylamine) in 20 ml. of acetic acid and 40 ml. of water is added 0.36 g. of potassium dichromate in 20 ml. of water. The reaction mixture is allowed to stand at room temperature for one hour and is then diluted with 400 ml. of water and made basic to pH 9 to 10 by adding ammonium hydroxide. The organic material is extracted with methylene chloride (two portions of 100 ml. each), the organic solution is dried over sodium sulfate and evaporated to dryness to yield the 2-methoxyethyl 18-epi-O-ethyl-3-dehydro-reserpate, which is used without further purification.

Other lower alkoxy-lower alkyl 18-epi-O-lower alkyl-3-iso-reserpates, in which lower alkyl of the lower alkoxy-lower alkyl group has from two to four carbon atoms, and separates lower alkoxy having from one to four carbon atoms from the 16β-carboxyl group by from two to three carbon atoms, which may be prepared according to the previously-described procedure, are, for example, 2-methoxyethyl 18-epi-O-methyl-3-iso-reserpate,
2-methoxyethyl 18-epi-O-n-propyl-3-iso-reserpate,
2-methoxyethyl 18-epi-O-isopropyl-3-iso-reserpate,
2-ethoxyethyl 18-epi-O-methyl-3-iso-reserpate,
2-ethoxyethyl 18-epi-O-ethyl-3-iso-reserpate,
2-n-propyloxyethyl 18-epi-O-methyl-3-iso-reserpate,
2-isopropyloxyethyl 18-epi-O-ethyl-3-iso-reserpate,
2-methoxypropyl 18-epi-O-n-propyl-3-iso-reserpate,
2-methoxypropyl 18-epi-O-n-butyl-3-iso-reserpate,
2-methoxypropyl 18-epi-O-methyl-3-iso-reserpate,
3-ethoxypropyl 18-epi-O-isopropyl-3-iso-reserpate
and the like, or pharmaceutically acceptable acid addition salts, such as the hydrochlorides, sulfates, maleates and the like, of these compounds.

Other lower alkoxy-lower alkyl 18α-lower alkoxy-alloyohimbane 16β-carboxylates, which may be prepared according to the previously-described procedures are, for example, lower alkoxy-lower alkyl 18-epi-O-lower alkyl-9-methoxy-3-iso-deserpidates, e.g.
2-methoxyethyl 9-methoxy-18-epi-O-methyl-3-iso-deserpidate,
2-methoxyethyl 18-epi-O-ethyl-9-methoxy-3-isodeserpidate,
2-ethoxyethyl 9-methoxy-18-epi-O-methyl-3-iso-deserpidate,
2-ethoxyethyl 18-epi-O-isopropyl-9-methoxy-3-iso-deserpidate
and the like,
lower alkoxy-lower alkyl 18-epi-O-lower alkyl-10-methoxy-3-iso-deserpidates, e.g.
2-methoxyethyl 10-methoxy-18-epi-O-methyl-3-iso-deserpidate,
2-methoxyethyl 18-epi-O-ethyl-10-methoxy-3-iso-deserpidate,
2-methoxyethyl 18-epi-O-n-butyl-10-methoxy-3-iso-deserpidate,
2-methoxyethyl 10-methoxy-18-epi-O-n-propyl-3-iso-deserpidate,
2-ethoxyethyl 10-methoxy-18-epi-O-methyl-3-iso-deserpidate,
2-methoxypropyl 10-methoxy-18-epi-O-methyl-3-iso-deserpidate,
3-methoxypropyl 18-epi-O-ethyl-10-methoxy-3-iso-deserpidate and the like,
lower alkoxy-lower alkyl 11-ethoxy-18-epi-O-lower alkyl-deserpidates, e.g.
2-methoxyethyl 11-ethoxy-18-epi-O-methyl-3-iso-deserpidate,
2-methoxyethyl 11-ethoxy-18-epi-O-ethyl-3-iso-deserpidate and the like,
lower alkoxy-lower alkyl 18-epi-O-lower alkyl-11-n-propyloxy-3-iso-deserpidates, e.g.
2-methoxyethyl 18-epi-O-methyl-11-n-propyloxy-3-iso-deserpidate,
2-ethoxyethyl 18-epi-O-ethyl-11-n-propyloxy-3-iso-deserpidate and the like,
lower alkoxy-lower alkyl 11-isopropyloxy-18-epi-O-lower alkyl-3-iso-deserpidates, e.g.
2-methoxyethyl 11-iso-propyloxy-18-epi-O-methyl-3-iso-deserpidate,
2-methoxyethyl 11-isopropyloxy-18-epi-O-n-propyl-3-iso-deserpidate and the like,
lower alkoxy-lower alkyl 11-n-butyloxy-18-epi-O-lower alkyl-3-iso-deserpidates, e.g.
2-methoxyethyl 11-n-butyloxy-18-epi-O-methyl-3-iso-deserpidate,
2-methoxyethyl 11-n-butyloxy-18-epi-O-ethyl-3-iso-deserpidate and the like,
lower alkoxy-lower alkyl 18-epi-O-lower alkyl-12-methoxy-3-iso-deserpidates, e.g.
2-methoxyethyl 12-methoxy-18-epi-O-methyl-3-iso-deserpidate,
2-ethoxyethyl 18-epi-O-n-butyl-12-methoxy-3-iso-deserpidate and the like,
lower alkoxy-lower alkyl 18-epi-O-lower alkyl-3-iso-deserpidates, e.g.
2-methoxyethyl 18-epi-O-methyl-3-iso-deserpidate,
2-methoxyethyl 18-epi-O-ethyl-3-iso-deserpidate,
2-methoxyethyl 18-epi-O-n-propyl-3-iso-deserpidate,
2-methoxyethyl-18-epi-O-isopropyl-3-iso-deserpidate,
2-methoxyethyl 18-epi-O-isobutyl-3-iso-deserpidate,
2-ethoxyethyl 18-epi-O-methyl-3-iso-deserpidate,
2-ethoxyethyl 18-epi-O-ethyl-3-iso-deserpidate,
2-n-propyl-oxyethyl 18-epi-O-ethyl-3-iso-deserpidate,
2-n-butyloxyethyl 18-epi-O-methyl-3-iso-deserpidate,
2-methoxypropyl 18-epi-O-ethyl-3-iso-deserpidate,
2-methoxypropyl 18-epi-O-n-propyl-3-iso-deserpidate,
3-methoxypropyl 18-epi-O-methyl-3-iso-deserpidate,
3-ethoxypropyl 18-epi-O-ethyl-3-iso-deserpidate and the like, or lower alkoxy-lower alkyl 18-epi-O-lower alkyl-3-iso-deserpidates, in which the 5-position, the 6-position, the 9-position, the 10-position or the 11-position is substituted by methyl, or in which the 10-position or the 11-position is substituted by methyl, or in which the 10-position or the 11-position is substituted by benzyloxy or by fluoro, chloro or bromo, or simultaneously by methylenedioxy, or in which the 9- and 12-positions or the 11- and 12-positions each have a chloro atom, or in which the 11-position is substituted by lower alkyl-mercapto, e.g. methylmercapto, ethylmercapto and the like, or in which the 17α-methoxy group is replaced by another alkoxy group, e.g. ethoxy, n-propyloxy, isopropyloxy and the like, by cyano or by N-acetyl-N-methyl-amino, or lower alkoxy-lower alkyl 18-epi-O-lower alkyl-3-iso-reserpates, in which the 5-position or the 6-position is substituted by methyl, or in which the 10-position is substituted by methoxy or the 9- and the 10-positions each have a methoxy group, or in which the 10-position carries chloro or bromo, or in which the 17α-methoxy group is replaced by another lower alkoxy group, e.g. ethoxy, n-propyloxy, isopropyloxy and the like, by cyano or N-acetyl-N-methyl-amino, or pharmaceutically acceptable, nontoxic addition salts of such compounds. In the above lower alkoxy-lower alkyl 18-epi-O-lower alkyl-3-iso-reserpates and lower alkoxy-lower alkyl 18-epi-O-lower alkyl-3-iso-deserpidates, lower alkyl of the lower alkoxy-lower alkyl group has from two to three carbon atoms, and separates lower alkoxy, having from one to four carbon atoms, by from two to three carbon atoms from the 16β-carboxyl group; the compounds are prepared according to any of the previously-shown procedures, particularly the method shown in the above example.

Another group of lower alkoxy-lower alkyl 18-lower alkoxy-allo-yohimbane 16β-carboxylates is represented by the lower alkoxy-lower alkyl 18-O-lower alkyl-3-iso-reserpates, in which lower alkyl of the lower alkoxy-lower alkyl group has from two to three carbon atoms and separates lower alkoxy, having from one to four carbon atoms, from the 16β-carboxyl group by from two to three carbon atoms, e.g.

2-methoxyethyl 18-O-methyl-3-iso-reserpate,
2-methoxyethyl 18-O-ethyl-3-iso-reserpate,
2-methoxyethyl 18-O-n-propyl-3-iso-reserpate,
2-methoxyethyl 18-O-isopropyl-3-iso-reserpate,
2-methoxyethyl-18-O-n-butyl-3-iso-reserpate,
2-ethoxyethyl 18-O-methyl-3-iso-reserpate,
2-ethoxyethyl 18-O-ethyl-3-iso-reserpate,
2-ethoxyethyl 18-O-isobutyl-3-iso-reserpate,
2-n-propyloxyethyl 18-O-ethyl-3-iso-reserpate,
2-isopropyloxyethyl 18-O-methyl-3-iso-reserpate,
2-methoxypropyl 18-O-ethyl-3-iso-reserpate,
2-methoxypropyl 18-O-secondary butyl-3-iso-reserpate,
3-ethoxypropyl 18-O-n-propyl-3-iso-reserpate and the like, or pharmaceutically acceptable acid addition salts of these compounds.

Other lower alkoxy-lower alkyl 18β-lower alkyl-alloyohimbane 16β-carboxylates are, for example, lower alkoxy-lower alkyl 18-O-lower alkyl-9-methoxy-3-iso-deserpidates, e.g.
2-methoxyethyl 9-methoxy-18-O-methyl-3-iso-deserpidate,
2-methoxyethyl 18-O-ethyl-9-methoxy-3-iso-deserpidate,
2-ethoxyethyl 9-methoxy-18-O-methyl-3-iso-deserpidate,
2-ethoxyethyl 9-methoxy-18-O-n-propyl-3-iso-deserpidate and the like,
lower alkoxy-lower alkyl 18-O-lower alkyl-10-methoxy-3-iso-deserpidates, e.g.
2-methoxyethyl 10-methoxy-18-O-methyl-3-iso-deserpidates,
2-methoxyethyl 18-O-ethyl-10-methoxy-3-iso-deserpidate,
2-methoxyethyl 10-methoxy-18-O-methyl-3-iso-deserpidate,
2-methoxyethyl 18-O-isopropyl-10-methoxy-3-iso-deserpidate,
2-ethoxyethyl 10-methoxy-18-O-methyl-3-iso-deserpidate,
2-methoxypropyl 18-O-ethyl-10-methoxy-3-iso-deserpidate,
3-methoxypropyl 10-methoxy-18-O-methyl-3-iso-deserpidate and the like,
lower alkoxy-lower alkyl 11-ethoxy-18-O-lower alkyl-3-iso-deserpidates, e.g.
2-methoxyethyl 11-ethoxy-18-O-methyl-3-iso-deserpidate,
2-methoxyethyl 11-ethoxy-18-O-ethyl-3-iso-deserpidate and the like,
lower alkoxy-lower alkyl 18-O-lower alkyl-11-n-propyloxy-3-iso-deserpidates, e.g.
2-methoxyethyl 18-O-methyl-11-n-propyloxy-3-iso-deserpidate,
2-ethoxyethyl 18-O-ethyl-11-n-propyloxy-3-iso-deserpidate and the like,
lower alkoxy-lower alkyl 11-isopropyloxy-18-O-lower alkyl-3-iso-deserpidates, e.g.
2-methoxyethyl 11-isopropyloxy-18-O-methyl-3-iso-deserpidate,
2-methoxyethyl 18-O-ethyl-11-isopropyloxy-3-iso-deserpidate and the like,
lower alkoxy-lower alkyl 11-n-butyloxy-18-O-lower alkyl-3-iso-deserpidates, e.g.
2-methoxyethyl 11-n-butyloxy-18-O-methyl-3-iso-deserpidate,
2-methoxyethyl 11-n-butyloxy-18-O-ethyl-3-iso-deserpidate and the like,
lower alkoxy-lower alkyl 18-O-lower alkyl-12-methoxy-3-iso-deserpidates, e.g.
2-methoxyethyl 12-methoxy-18-O-methyl-3-iso-deserpidate,
2-ethoxyethyl 18-O-ethyl-12-methoxy-3-iso-deserpidate and the like,
lower alkoxy-lower alkyl 18-O-lower alkyl-3-iso-deserpidates, e.g.
2-methoxyethyl 18-O-methyl-3-iso-deserpidate,
2-methoxyethyl 18-O-ethyl-3-iso-deserpidate,
2-methoxyethyl 18-O-n-propyl-3-iso-deserpidate,
2-methoxyethyl 18-O-isopropyl-3-iso-deserpidate,
2-methoxyethyl 18-O-n-butyl-3-iso-deserpidate,
2-ethoxyethyl 18-O-methyl-3-iso-deserpidate,
2-ethoxyethyl 18-O-ethyl-3-iso-deserpidate,
2-n-propyloxyethyl 18-O-ethyl-3-iso-deserpidate,
2-n-butyloxyethyl 18-O-methyl-3-iso-deserpidate,
2-methoxypropyl 18-O-ethyl-3-iso-deserpidate,
2-methoxypropyl 18-O-n-propyl-3-iso-deserpidate,
3-methoxypropyl 18-O-ethyl-3-iso-deserpidate,
3-ethoxypropyl 18-O-methyl-3-iso-deserpidate and the like, or lower alkoxy-lower alkyl 18-O-lower alkyl-3-iso-deserpidates, in which the 5-position, the 6-position, the 9-position, the 10-position or the 11-position is substituted by methyl, or in which the 10-position or the 11-position is substituted by benzyloxy or by fluoro, chloro or bromo, or simultaneously by methylenedioxy, or in which the 9- and 12-positions or the 11- and 12-positions each have a chloro atom, or in which the 11-position is substituted by lower alkylmercapto, e.g. methylmercapto, ethylmercapto and the like, or in which the 17α-methoxy group is replaced by another alkoxy group, e.g. ethoxy, n-propyloxy, isopropyloxy and the like, by cyano or by N-acetyl-N-methyl-amino, or lower alkoxy-lower alkyl 18-O-lower alkyl-3-iso-reserpates, in which the 5-position or the 6-position is substituted by methyl, or in which the 10-position is substituted by methoxy or the 9- and the 10-positions each have a methoxy group, or in which the 10-position carries chloro or bromo, or in which the 17α-methoxy group is replaced by another lower alkoxy group, e.g. ethoxy, n-propyloxy, isopropyloxy and the like, by cyano or by N-acetyl-N-methyl-amino, or pharmaceutically acceptable, non-toxic addition salts of such compounds. In the above lower alkoxy-lower alkyl 18-O-lower alkyl-3-iso-reserpates and lower alkoxy-lower alkyl 18-O-lower alkyl-3-iso-deserpidates, lower alkyl of the lower alkoxy-lower alkyl group has from two to three carbon atoms, and separates lower alkoxy having from one to four carbon atoms, by from two to three carbon atoms from the 16β-carboxyl group; the compounds are prepared according to any of the previously-shown procedures, particularly the method shown in the above example.

*Example 7*

A mixture of 1.0 g. of 2-methoxyethyl 18-epi-O-(2-methoxyethyl)-reserpate and 0.5 g. of a palladium catalyst (10 percent palladium on charcoal) in 30 ml. of anhydrous ethanol and 10 ml. of N,N,N-triethylamine is hydrogenated at atmospheric pressure for seven days. The catalyst is filtered off, the solvents are evaporated to dryness and the residue is taken up in 100 ml. of methylene chloride. The organic solution is washed with 50 ml. of dilute aqueous ammonium hydroxide, dried over sodium sulfate and evaporated to dryness. The residue is crystallized from methanol to yield the 2-methoxyethyl 18-epi-O-(2-methoxyethyl)-3 - iso - reserpate, M.P. 150–152°; the product is identical with that obtained according to the procedure of Example 1.

Example 8

A mixture of 1.0 g. of 2-methoxyethyl 18-epi-O-(2-methoxyethyl)-reserpate, 0.2 g. of a platinum catalyst (platinum oxide), and 4.0 ml. of methanol is shaken for three days in hydrogen at atmospheric pressure. The catalyst is filtered off, the solvents are evaporated and 200 ml. of water is added to the residue. The aqueous mixture is made basic (pH 8–9) with aqueous ammonia and the organic material is extracted with methylene chloride. The organic solution is dried over sodium sulfate and evaporated to dryness and the residue is crystallized from a mixture of methanol and petroleum ether to yield the desired 2-methoxyethyl 18-epi-O-(2-methoxyethyl)-3-iso-reserpate, which melts at 149–152° and is identical with the product obtained according to the procedures of Examples 1 and 7.

According to the previously-described procedures, the compounds of the formula:

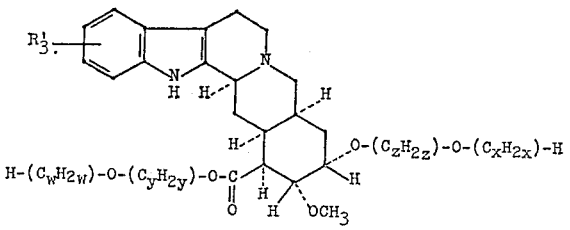

in which $R_3'$, the letters $w$, $x$, $y$ and $z$ and the groups of the formula $-(C_yH_{2y})-$ and $-(C_zH_{2z})-$ have the previously-given meaning, or salts thereof, may be prepared, by removing in a compound of the formula:

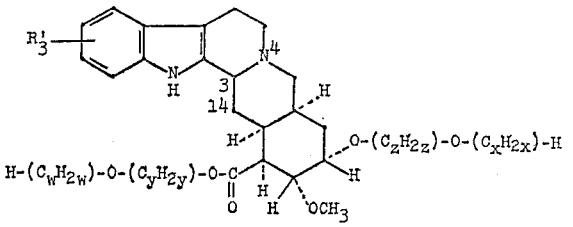

in which $R_3'$, the letters $w$, $x$, $y$ and $z$ and the groups of the formula $-(C_yH_{2y})-$ and $-(C_zH_{2z})-$ have the previously-given meaning, and in which a double bond extends from the 3-position, or a salt thereof, the double bond extending from the 3-position, and isolating the desired compound, or isomerizing in a compound of the formula:

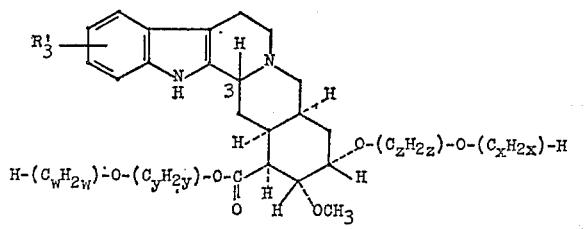

in which $R_3'$, the letters $w$, $x$, $y$ and $z$ and the groups of the formula $-(C_yH_{2y})-$ and $-(C_zH_{2z})-$ have the previously-given meaning, or a salt thereof, the 3β-hydrogen and isolating the desired compound, or reacting a compound of the formula:

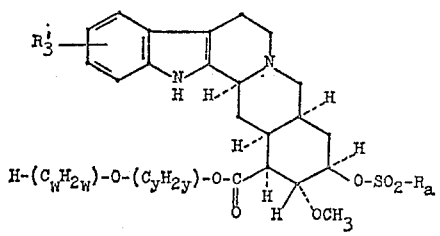

in which $R_3'$, the letters $w$ and $y$ and the group of the formula $-(C_yH_{2y})-$ have the previously-given meaning, and $R_a$ stands for an organic radical, or a salt thereof, with a compound of the formula $$HO-(C_zH_{2z})-O-(C_xH_{2x})-H$$

in which the letters $x$ and $z$ and the group of the formula $-(C_zH_{2z})-$ have the previously-given meaning, or etherifying in a compound of the formula:

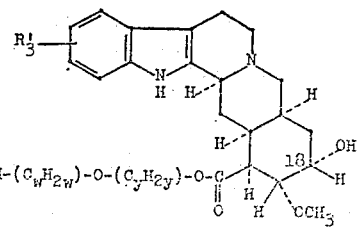

in which $R_3'$, the letters $w$ and $y$ and the group of the formula $-(C_yH_{2y})-$ have the previously-given meaning, or a salt thereof, the hydroxyl group of the 18α-position by treatment with a diazo-compound of the formula $N_2-(C_zH_{2z})-O-(C_xH_{2x})-H$, in which the letters $x$ and $z$ and the group of the formula $-(C_zH_{2z})-$ have the previously-given meaning, in the presence of a strong inorganic Lewis acid, or converting in a compound of the formula:

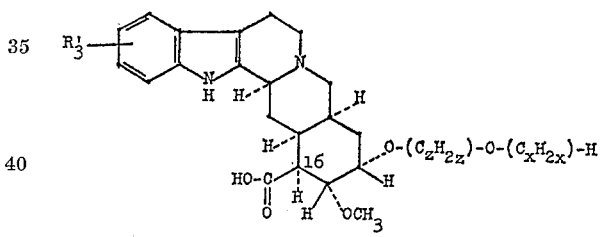

in which $R_3'$, the letters $x$ and $z$ and the group of the formula $-(C_zH_{2z})-$ have the previously-given meaning, or a salt thereof, the free carboxyl group of the 16β-position into the group of the formula $$H-(C_wH_{2w})-O-(C_yH_{2y})-O-CO-$$

in which the letters $w$ and $y$ and the group of the formula $-(C_yH_{2y})-$ have the previously-given meaning, or converting in a compound of the formula:

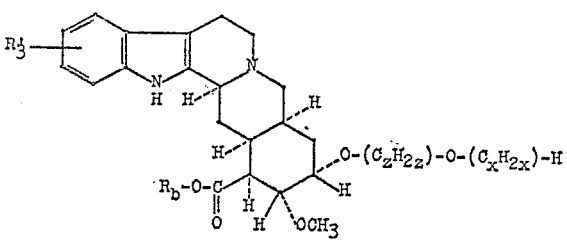

in which $R_3'$, the letters $x$ and $z$ and the group of the formula $-(C_zH_{2z})-$ have the previously-given meaning, and in which $R_b$ is an organic group other than the group of the formula $H-(C_wH_{2w})-O-(C_yH_{2y})-$, in which the letters $w$ and $y$ and the group of the formula $-(C_yH_{2y})-$ have the above-given meaning, or a salt thereof, the group $R_b$ into the group of the formula $H-(C_wH_{2w})-O-(C_yH_{2y})-$, in which the letters $w$ and $y$ and the group of the formula $-(C_yH_{2y})-$ have the previously-given meaning, or dequaternizing a quaternary salt of a compound of the formula:

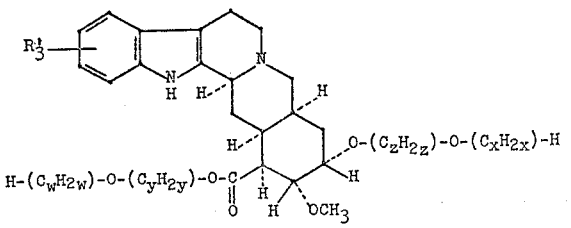

in which $R_3'$, the letters $w$, $x$, $y$ and $z$ and the groups of the formula $—(C_yH_{2y})—$ and $—(C_zH_{2z})—$ have the previously-given meaning or reacting an N-oxide of the formula:

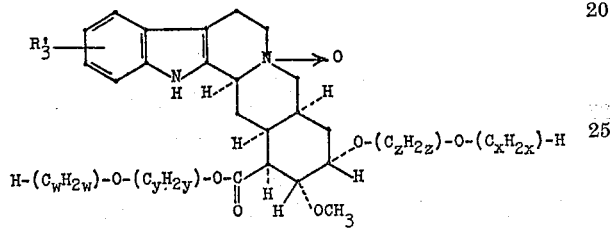

in which $R_3'$, the letters $w$, $x$, $y$ and $z$ and the groups of the formula $—(C_yH_{2y})—$ and $—(C_zH_{2z})—$ have the previously-given meaning, or a salt thereof, with a reducing reagent capable of removing the N-oxide group, and, if desired, carrying out the optional steps.

In the above procedure those starting materials are primarily utilized, which lead to the formation of the lower alkoxy-lower alkyl 18-epi-O-lower alkoxy-lower alkyl-3-iso reserpates, in which lower alkyl has from two to three carbon atoms and separates lower alkoxy having from one to four carbon atoms from the 16β-carboxyl group and three carbon atoms from the 18α-oxygen atom, respectively, particularly the 2-lower alkoxy-ethyl 18-epi-O-(2-lower alkoxy-ethyl)-3-iso-reserpates, in which lower alkoxy has from one to four carbon atoms, or pharmaceutically acceptable, non-toxic acid addition salts thereof.

What is claimed is:

1. A member selected from the group consisting of a compound having one of the formulae:

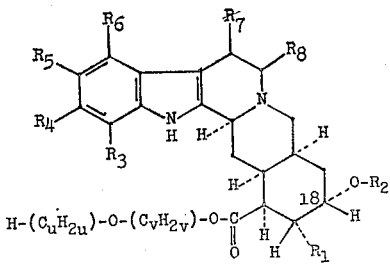

and

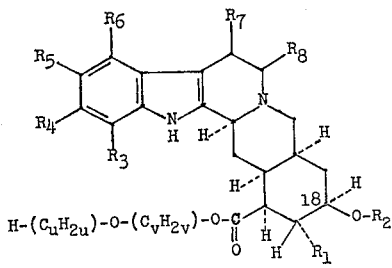

in which the letter $u$ stands for an integer from 1 to 4, the letter $v$ stands for an integer from 2 to 4, the group of the formula $—(C_vH_{2v})—$ separates the two oxygen atoms attached to this radical by at least two carbon atoms, $R_1$ stands for a member selected from the group consisting of lower alkoxy, cyano and N-lower alkanoyl-N-lower alkyl-amino, $R_2$ is a member selected from the group consisting of lower alkyl and lower alkoxy-lower alkyl in which lower alkyl, having from two to four carbon atoms, separates lower alkoxy from the 18-oxygen atom by at least two carbon atoms, each of the groups $R_3$, $R_4$, $R_5$ and $R_6$ stands for a member selected from the group consisting of hydrogen, lower alkyl, lower alkoxy, halogeno, lower alkyl-mercapto, and, when two adjacent groups $R_3$, $R_4$, $R_5$ and $R_6$ are taken together, for lower alkylenedioxy, and each of the groups $R_7$ and $R_8$ stands for a member selected from the group consisting of hydrogen and lower alkyl, a pharmaceutically acceptable, non-toxic acid addition salt thereof, an N-oxide thereof and a pharmaceutically acceptable, non-toxic acid addition salt of such N-oxide.

2. A compound of the formula:

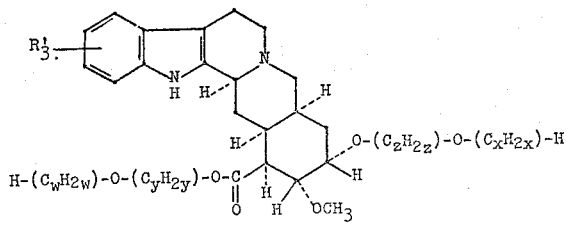

in which each of the letters $w$ and $x$ stands for an integer from 1 to 4, each of the letters $y$ and $z$ stands for an integer from 2 to 3, and each of the radicals of the formulae $—(C_yH_{2y})—$ and $—(C_zH_{2z})—$ separates the two oxygen atoms attached to these radicals by at least two carbon atoms, and $R_3'$ stands for lower alkoxy.

3. A pharmaceutically acceptable, non-toxic acid addition salt of a compound of the formula:

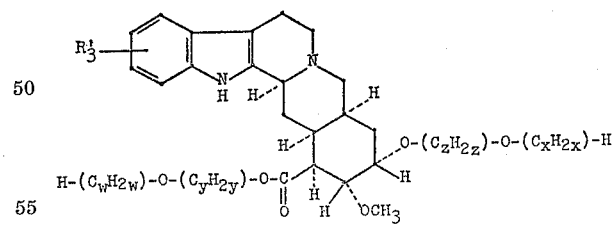

in which each of the letters $w$ and $x$ stands for an integer from 1 to 4, each of the letters $y$ and $z$ stands for an integer from 2 to 3, and each of the radicals of the formulae $—(C_yH_{2y})—$ and $—(C_zH_{2z})—$ separates the two oxygen atoms attached to these radicals by at least two carbon atoms, and $R_3'$ stands for lower alkoxy.

4. Lower alkoxy-lower alkyl 18-epi-O-lower alkoxy-lower alkyl-3-iso-reserpate, in which lower alkyl has from two to three carbon atoms, and separates lower alkoxy, having from one to four carbon atoms, from the 16β-carboxyl group and the 18α-oxygen atom by from two to three atoms.

5. A pharmaceutically acceptable, non-toxic acid addition salt of lower alkoxy-lower alkyl 18-epi-O-lower alkoxy-lower alkyl-3-iso-reserpate, in which lower alkyl has from two to three carbon atoms, and separates lower alkoxy, having from one to four carbon atoms, from the 16β-carboxyl group and the 18α-oxygen atom by from two to three carbon atoms.

6. 2-Methoxyethyl 18-epi-O-(2-methoxyethyl)-3-iso-reserpate.

7. A pharmaceutically acceptable, non-toxic acid addition salt of 2-methoxyethyl 18-epi-O-(2-methoxyethyl)-3-iso-reserpate.

8. 2-Methoxyethyl 18-epi-O-(2-methoxyethyl)-3-iso-reserpate maleate.

9. 2-Methoxy 18-epi-O-(2-ethoxyethyl)-3-iso-reserpate.

10. A compound of the formula:

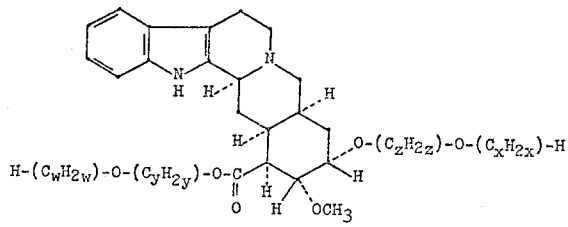

in which each of the letters $w$ and $x$ stands for an integer from 1 to 4, each of the letters $y$ and $z$ stands for an integer from 2 to 3, and each of the radicals of the formulae —$(C_yH_{2y})$— and —$(C_zH_{2z})$— separates the two oxygen atoms attached to these radicals by at least two carbon atoms.

11. A pharmaceutically acceptable non-toxic acid addition salt of a compound of the formula:

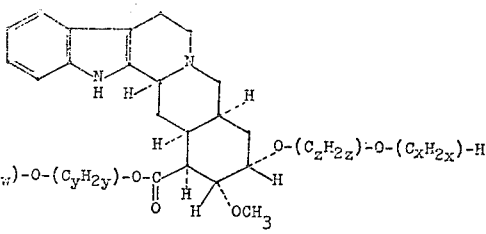

in which each of the letters $w$ and $x$ stands for an integer from 0 to 4, each of the letters $y$ and $z$ stands for an integer from 2 to 3, and each of the radicals of the formulae —$(C_yH_{2y})$— and —$(C_zH_{2z})$— separates the two oxygen atoms attached to these radicals by at least two carbon atoms.

12. 2-Lower alkoxy-ethyl 18-epi-O-(2-lower alkoxy-ethyl)-3-iso-reserpate.

13. A pharmaceutically acceptable, non-toxic acid addition salt of 2-lower alkoxy-ethyl 18-epi-O-(2-lower alkoxy-ethyl)-3-iso-reserpate.

14. 2-Methoxyethyl 18-epi-O-ethyl-3-iso-reserpate.

References Cited in the file of this patent
UNITED STATES PATENTS
2,877,225    Taylor _____ Mar. 10, 1959